(12) United States Patent
Park et al.

(10) Patent No.: US 11,265,097 B2
(45) Date of Patent: Mar. 1, 2022

(54) CODE DIVISION MULTIPLEXING GROUP HOPPING FOR MULTI-TRANSMISSION/RECEPTION POINT

(71) Applicant: QUALCOMM Incorporated, San Diego, CA (US)

(72) Inventors: Sungwoo Park, San Diego, CA (US); Mostafa Khoshnevisan, San Diego, CA (US); Xiaoxia Zhang, San Diego, CA (US); Tao Luo, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/802,229

(22) Filed: Feb. 26, 2020

(65) Prior Publication Data

US 2020/0287647 A1 Sep. 10, 2020

Related U.S. Application Data

(60) Provisional application No. 62/813,675, filed on Mar. 4, 2019.

(51) Int. Cl.
*H04J 13/00* (2011.01)
*H04L 27/26* (2006.01)
(Continued)

(52) U.S. Cl.
CPC ...... *H04J 13/0074* (2013.01); *H04L 27/2613* (2013.01); *H04W 72/042* (2013.01); *H04W 76/27* (2018.02); *H04W 80/02* (2013.01)

(58) Field of Classification Search
CPC .. H04J 13/0074; H04J 13/004; H04J 11/0053; H04J 11/0056; H04L 27/2613;
(Continued)

(56) References Cited

U.S. PATENT DOCUMENTS

2014/0254530 A1* 9/2014 Kim ................. H04L 5/005
370/329
2015/0036604 A1* 2/2015 Park ................. H04L 5/0037
370/329
(Continued)

FOREIGN PATENT DOCUMENTS

WO WO-2016127309 A1 8/2016

OTHER PUBLICATIONS

3GPPTS 36.211 V15.4.0 (Dec. 2018). (Year: 2018).*
(Continued)

*Primary Examiner* — Hassan A Phillips
*Assistant Examiner* — Mohammed S Chowdhury
(74) *Attorney, Agent, or Firm* — Danai Nelisile Mhembere; Holland & Hart LLP

(57) ABSTRACT

Methods, systems, and devices for wireless communications are described. A first transmission/reception point (TRP) may coordinate with a second transmission/reception point to configure code division multiplexing group hopping for a user equipment (UE). The first TRP may transmit a signal to the UE indicating that code division multiplexing group hopping is enabled for the first transmission/reception point and the second transmission/reception point. The first TRP may transmit, during a first instance of the code division multiplexing group hopping, a first reference signal to the UE according to a first code division multiplexing group. The first TRP may transmit, during a second instance of the code division multiplexing group hopping, the first reference signal to the UE according to a second code division multiplexing group.

32 Claims, 17 Drawing Sheets

(51) Int. Cl.
*H04W 76/27* (2018.01)
*H04W 80/02* (2009.01)
*H04W 72/04* (2009.01)

(58) Field of Classification Search
CPC ... H04W 76/27; H04W 80/02; H04W 72/042; H04W 72/0466; H04B 2001/6904; H04B 7/0404; H04B 7/0408
See application file for complete search history.

(56) References Cited

U.S. PATENT DOCUMENTS

| | | |
|---|---|---|
| 2017/0295000 A1 | 10/2017 | Yoo et al. |
| 2018/0026684 A1* | 1/2018 | Wei ...................... H04L 5/0007 370/329 |
| 2018/0192397 A1* | 7/2018 | Seo ....................... H04W 72/02 |
| 2019/0342062 A1* | 11/2019 | Ren ........................... H04L 5/10 |
| 2020/0266943 A1* | 8/2020 | Tsai ...................... H04L 5/0092 |
| 2020/0336181 A1* | 10/2020 | Cao ...................... H04B 17/336 |

OTHER PUBLICATIONS

3GPP TSG RAN WG1 Meeting NR#3; R1-1715865, Source: LG Electronics, Title: On DMRS design, Nagoya, Japan, Sep. 18-21, 2017. (Year: 2017).*
3GPP TSG-RAN WG1 Meeting Ad-hoc#3 R1-1716228, Source: MediaTek Inc., Title: On downlink DMRS remaining issues, Nagona, Japan, Sep. 18-Sep. 21, 2017. (Year: 2017).*
3GPP TSG RAN WG1 Meeting 91; R1-1720076, Source: Intel Corporation, Title: On the remaining details of DM-RS ; Reno, USA, Nov. 27-Dec. 1, 2017. (Year: 2017).*
International Search Report and Written Opinion—PCT/US2020/020133—ISAEPO—dated Aug. 13, 2020.

* cited by examiner

CODE DIVISION MULTIPLEXING GROUP HOPPING FOR MULTI-TRANSMISSION/RECEPTION POINT

CROSS REFERENCE

The present application for patent claims the benefit of U.S. Provisional Patent Application No. 62/813,675 by PARK et al., entitled "CODE DIVISION MULTIPLEXING GROUP HOPPING FOR MULTI-TRANSMISSION/RECEPTION POINT," filed Mar. 4, 2019, assigned to the assignee hereof, and expressly incorporated herein.

INTRODUCTION

The following relates to wireless communications, and more specifically to communications between a user equipment (UE) and multi-transmission/reception points (TRPs).

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as a UE.

SUMMARY

A method of wireless communication at a UE is described. The method may include determining a first code division multiplexing (CDM) group associated with a first transmission/reception point (TRP) and a second CDM group associated with a second TRP. The method may include receiving a signal indicating that CDM group hopping is enabled for the first TRP and the second TRP. The method may include receiving, during a first instance of the CDM group hopping, a first reference signal from the first TRP according to the first CDM group and a second reference signal from the second TRP according to the second CDM group. The method may include receiving, during a second instance of the CDM group hopping, the first reference signal from the first TRP according to the second CDM group and the second reference signal from the second TRP according to the first CDM group.

An apparatus for wireless communication at a UE is described. The apparatus may include a processor and memory coupled to the processor. The processor and memory may be configured to determine a first CDM group associated with a first TRP and a second CDM group associated with a second TRP. The apparatus may be further configured to receive a signal indicating that CDM group hopping is enabled for the first TRP and the second TRP. The apparatus may be further configured to receive, during a first instance of the CDM group hopping, a first reference signal from the first TRP according to the first CDM group and a second reference signal from the second TRP according to the second CDM group. The apparatus may be configured to receive, during a second instance of the CDM group hopping, the first reference signal from the first TRP according to the second CDM group and the second reference signal from the second TRP according to the first CDM group.

Another apparatus for wireless communication at a UE is described. The apparatus may include means for determining a first CDM group associated with a first TRP and a second CDM group associated with a second TRP. The apparatus may include means for receiving a signal indicating that CDM group hopping is enabled for the first TRP and the second TRP. The apparatus may include means for receiving, during a first instance of the CDM group hopping, a first reference signal from the first TRP according to the first CDM group and a second reference signal from the second TRP according to the second CDM group. The apparatus may include means for receiving, during a second instance of the CDM group hopping, the first reference signal from the first TRP according to the second CDM group and the second reference signal from the second TRP according to the first CDM group.

A non-transitory computer-readable medium storing code for wireless communication at a UE is described. The code may include instructions executable by a processor to determine a first CDM group associated with a first TRP and a second CDM group associated with a second TRP. The instructions may be executable by the processor to receive a signal indicating that CDM group hopping is enabled for the first TRP and the second TRP, receive, during a first instance of the CDM group hopping, a first reference signal from the first TRP according to the first CDM group and a second reference signal from the second TRP according to the second CDM group, and receive, during a second instance of the CDM group hopping, the first reference signal from the first TRP according to the second CDM group and the second reference signal from the second TRP according to the first CDM group.

Some examples of the method, apparatuses, and non-transitory computer-readable medium described herein may further include operations, features, means, or instructions for decoding the signal indicating that CDM group hopping may be enabled to identify the first CDM group and the second CDM group.

In some examples of the method, apparatuses, and non-transitory computer-readable medium described herein, the signal includes at least one of a radio resource control (RRC) signal, a medium access control (MAC) control element (CE), or a combination thereof.

In some examples of the method, apparatuses, and non-transitory computer-readable medium described herein, the signal indicates a hopping pattern for the CDM group hopping, and the first instance and the second instance may be based on the hopping pattern.

Some examples of the method, apparatuses, and non-transitory computer-readable medium described herein may further include operations, features, means, or instructions for decoding at least one of an RRC signal, a MAC CE, or a combination thereof, to identify the first CDM group and the second CDM group, and decoding, for each of the first instance and the second instance, a downlink control information (DCI) to identify the indication that CDM hopping may be enabled and to identify a hopping pattern for the CDM group hopping.

Some examples of the method, apparatuses, and non-transitory computer-readable medium described herein may further include operations, features, means, or instructions for decoding, for each of the first instance and the second instance, a demodulation reference signal (DMRS) port toggling flag of the DCI to identify the indication that CDM group hopping may be enabled.

Some examples of the method, apparatuses, and non-transitory computer-readable medium described herein may further include operations, features, means, or instructions for decoding, for each of the first instance and the second instance, a DCI to identify the indication that CDM hopping may be enabled.

Some examples of the method, apparatuses, and non-transitory computer-readable medium described herein may further include operations, features, means, or instructions for recovering, for each of the first instance and the second instance, an antenna port parameter value from the DCI, and accessing, using the antenna port parameter value, an antenna port mapping table to identify the first CDM group associated with the first TRP and the second CDM group associated with the second TRP.

Some examples of the method, apparatuses, and non-transitory computer-readable medium described herein may further include operations, features, means, or instructions for identifying a third CDM group associated with a third TRP, and receiving, during a third instance of the CDM group hopping, a third reference signal from the third TRP according to the third CDM group.

A method of wireless communication at a first TRP is described. The method may include coordinating with a second TRP to configure CDM group hopping for a UE. The method may include transmitting a signal to the UE indicating that CDM group hopping is enabled for the first TRP and the second TRP. The method may include transmitting, during a first instance of the CDM group hopping, a first reference signal to the UE according to a first CDM group, and transmitting, during a second instance of the CDM group hopping, the first reference signal to the UE according to a second CDM group.

An apparatus for wireless communication at a first TRP is described. The apparatus may include a processor and memory coupled to the processor. The processor and memory may be configured to coordinate with a second TRP to configure CDM group hopping for a UE. The memory and processor may be configured to transmit a signal to the UE indicating that CDM group hopping is enabled for the first TRP and the second TRP. The processor and memory may be configured to transmit, during a first instance of the CDM group hopping, a first reference signal to the UE according to a first CDM group, and transmit, during a second instance of the CDM group hopping, the first reference signal to the UE according to a second CDM group.

Another apparatus for wireless communication at a first TRP is described. The apparatus may include means for coordinating with a second TRP to configure CDM group hopping for a UE, transmitting a signal to the UE indicating that CDM group hopping is enabled for the first TRP and the second TRP, transmitting, during a first instance of the CDM group hopping, a first reference signal to the UE according to a first CDM group, and transmitting, during a second instance of the CDM group hopping, the first reference signal to the UE according to a second CDM group.

A non-transitory computer-readable medium storing code for wireless communication at a first TRP is described. The code may include instructions executable by a processor to coordinate with a second TRP to configure CDM group hopping for a UE, transmit a signal to the UE indicating that CDM group hopping is enabled for the first TRP and the second TRP, transmit, during a first instance of the CDM group hopping, a first reference signal to the UE according to a first CDM group, and transmit, during a second instance of the CDM group hopping, the first reference signal to the UE according to a second CDM group.

Some examples of the method, apparatuses, and non-transitory computer-readable medium described herein may further include operations, features, means, or instructions for encoding the signal indicating that CDM group hopping may be enabled to identify the first CDM group and the second CDM group.

In some examples of the method, apparatuses, and non-transitory computer-readable medium described herein, the signal includes at least one of an RRC signal, a MAC CE, or a combination thereof.

In some examples of the method, apparatuses, and non-transitory computer-readable medium described herein, the signal indicates a hopping pattern for the CDM group hopping, and the first instance and the second instance may be based on the hopping pattern.

Some examples of the method, apparatuses, and non-transitory computer-readable medium described herein may further include operations, features, means, or instructions for encoding at least one of an RRC signal, a MAC CE, or a combination thereof, to indicate the first CDM group and the second CDM group, and encoding, for each of the first instance and the second instance, a DCI to indicate that CDM hopping may be enabled and to indicate a hopping pattern for the CDM group hopping.

Some examples of the method, apparatuses, and non-transitory computer-readable medium described herein may further include operations, features, means, or instructions for encoding, for each of the first instance and the second instance, a DMRS port toggling flag of the DCI to indicate that CDM group hopping may be enabled.

Some examples of the method, apparatuses, and non-transitory computer-readable medium described herein may further include operations, features, means, or instructions for encoding, for each of the first instance and the second instance, a DCI to indicate that CDM hopping may be enabled.

Some examples of the method, apparatuses, and non-transitory computer-readable medium described herein may further include operations, features, means, or instructions for encoding, for each of the first instance and the second instance, an antenna port parameter value of the DCI to indicate the first CDM group associated and the second CDM group.

Some examples of the method, apparatuses, and non-transitory computer-readable medium described herein may further include operations, features, means, or instructions for coordinating with a third TRP to configure the CDM group hopping for the UE, and transmitting, during a third instance of the CDM group hopping, the first reference signal to the UE according to a third CDM group.

DETAILED DESCRIPTION

Figure 1:
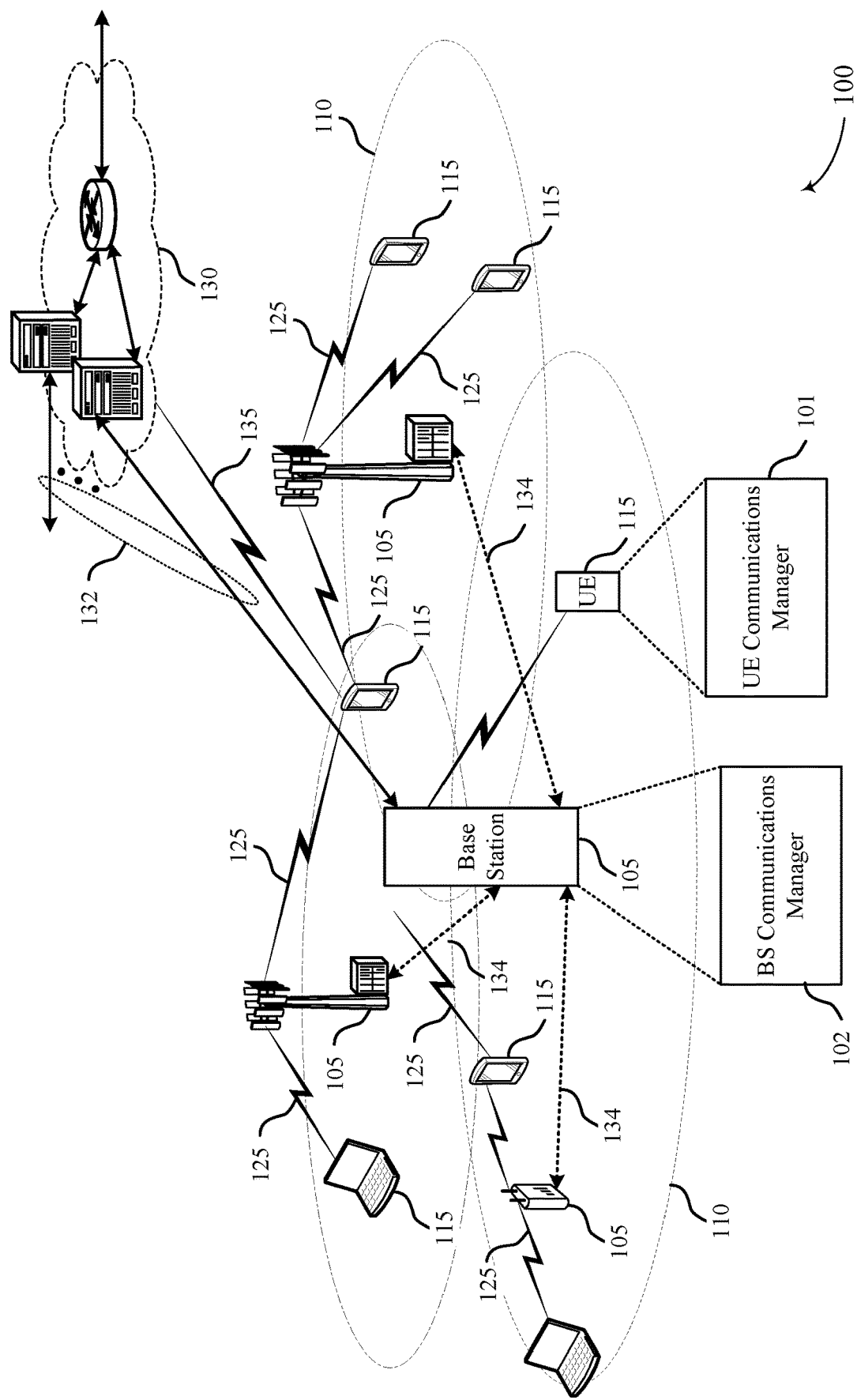
FIG. 1 illustrates an example of a system for wireless communications that supports code division multiplexing (CDM) group hopping for multi-transmission/reception point (TRP), in accordance with one or more aspects of the present disclosure.

In some wireless communication systems, base stations may communicate with user equipments (UEs) using transmission/reception points (TRPs) (e.g., using a single TRP at a base station, using multiple TRPs corresponding to a same base station, and/or using multiple TRPs corresponding to multiple base stations). In cases where the network uses multiple TRPs to communicate with the UE, whether at the same base station or different base stations, the network may use a number of different multi-TRP configurations for the communication. Some multi-TRP configurations may include assigning a code division multiplexing (CDM) group to each TRP for demodulation reference signal (DMRS) transmissions to the UE. The DMRS configuration for each TRP may be static for a given transmission, which may introduce collisions or otherwise introduce errors when a neighboring TRP uses the same DMRS configuration (e.g., based on the same CDM group).

Accordingly, aspects of the described techniques provide mechanisms that support CDM group hopping in a multi-TRP environment. Generally, the TRPs, whether at the same base station or different base stations, may coordinate (alone or in conjunction with the base station(s) and/or other network entities) various aspects of the CDM group hopping parameters for a UE. In some aspects, this may include associating one or more CDM groups with each TRP, where each CDM group being associated with one or more ports. The UE may identify which CDM group is associated with which TRP and receive a signal indicating that CDM group hopping has been enabled for the TRPs. In some aspects, the signal indicating that CDM group hopping may be enabled may identify which CDM group may be associated with which TRP. In other aspects, the association between CDM group and TRP (which may be referred to as the CDM group mapping) may be signaled separately. Accordingly, each TRP may transmit reference signals (e.g., DMRSs) to the UE according to the CDM group hopping. In some aspects, this may include each TRP transmitting its own reference signal to the UE according to their respective CDM group during one instance of the CDM group hopping, and then the CDM group changing (e.g., hopping) for the next instance to be associated with a different TRP. For example, a first CDM group may be associated with the first TRP and used for transmitting a first reference signal during a first instance, but then the first CDM group may be associated with a second TRP and used for transmitting a second reference signal during a second instance of the CDM group hopping. Accordingly, CDM group hopping between TRPs performing downlink transmissions to a UE may reduce interference by a hidden TRP that may select the same CDM group as the serving TRPs may be using to perform a downlink transmission to the UE.

Aspects of the disclosure are initially described in the context of a wireless communication system. Aspects of the disclosure are further illustrated by and described with reference to apparatus diagrams, system diagrams, and flowcharts that relate to CDM group hopping for multi-TRP.

FIG. 1 illustrates an example of a wireless communication system 100 that supports CDM group hopping for multi-TRP, in accordance with one or more aspects of the present disclosure. The wireless communication system 100 includes base stations 105, UEs 115, and a core network 130. In some examples, the wireless communication system 100 may be an LTE network, an LTE-A network, an LTE-A Pro network, or a NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a TRP. In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, e.g., in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz Industrial, Scientific, and Medical (ISM) band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples, the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A base station 105 in wireless communication system 100 may transmit DMRSs in a downlink channel to a UE 115, and the UE 115 may use the DMRSs to perform channel estimation to decode data in the downlink channel. In some cases, a base station 105 may transmit a DMRS configuration (e.g., an index to a table) to a UE 115 which may indicate a number of DMRS CDM groups without data and the DMRS port(s) used to transmit DMRSs for the UE 115. Table 1 is an example of a table that a UE 115 may reference to determine a DMRS configuration based on an index received from a base station 105.

TABLE 1

DMRS Configuration Table
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |

TABLE 1-continued

DMRS Configuration Table
One Codeword:
Codeword 0 enabled,
Codeword 1 disabled

| Value | Number of DMRS CDM group(s) without data | DMRS port(s) |
|---|---|---|
| 11 | 2 | 0, 2 |
| 12-15 | Reserved | Reserved |

Different tables may indicate the DMRS configuration for different numbers of codewords, different types of DMRS, etc. As an example, a first type of DMRS (e.g., DMRS Configuration Type 1) may be associated with a frequency division (FD)-time division (TD) orthogonal cover code (OCC) and a comb level of 2 (e.g., four ports for one symbol or eight ports for two symbols). A second type of DMRS (e.g., DMRS Configuration Type 2) may be associated with a circular shift (CS) of 4 (i.e., CS4) and a comb level of three (e.g., six ports for one symbol or twelve ports for two symbols).

In a multi-TRP scenario, the base station 105 (or network entity) may utilize semi-static DMRS partitioning, where different CDM groups are assigned to different TRPs. For example, one or more DMRSs for a first physical downlink shared channel (PDSCH) from a first TRP may be selected from a first CDM group (e.g., CDM group #0) and one (or more) DMRS(s) for a second PDSCH from a second TRP may be selected from a second CDM group (e.g., CDM group #1). In some aspects, each CDM group may be associated with one or more ports. In some aspects, the PDSCH DMRS within the same CDM group may be quasi-co-located (QCL) with respect to Doppler shift, Doppler spread, average delay, delay spread, spatial reception, and the like.

However, in some scenarios, an interfering TRP may select or otherwise use a similar CDM group as one of the serving TRPs of a UE 115 is using. For example, the interfering TRP may use the first CDM group and/or the second CDM group when performing PDSCH transmissions for a different UE 115. This may reduce the decoding performance of the PDSCH from the serving TRP using the same CDM group. Accordingly, aspects of the described techniques provide mechanisms to support inference mitigation by implementing CDM group hopping between the serving TRPs.

For example, one or more of the base stations 105 (which may be considered a TRP in this context) may include a base station communications manager 102, which may coordinate with a second TRP to configure CDM group hopping for a UE 115. The base station communications manager 102 may transmit a signal to the UE 115 indicating that CDM group hopping is enabled for the first TRP and the second TRP. The base station communications manager 102 may transmit, during a first instance of the CDM group hopping, a first reference signal to the UE 115 according to a first CDM group. The base station communications manager 102 may transmit, during a second instance of the CDM group hopping, the first reference signal to the UE 115 according to a second CDM group.

As another example, one or more UEs 115 may include a UE communications manager 101, which may determine a first CDM group associated with a first TRP and a second CDM group associated with a second TRP. The UE communications manager 101 may receive a signal indicating that CDM group hopping is enabled for the first TRP and the second TRP. The UE communications manager 101 may receive, during a first instance of the CDM group hopping, a first reference signal from the first TRP according to the first CDM group and a second reference signal from the second TRP according to the second CDM group. The UE communications manager 101 may receive, during a second instance of the CDM group hopping, the first reference signal from the first TRP according to the second CDM group and the second reference signal from the second TRP according to the first CDM group.

Figure 2:
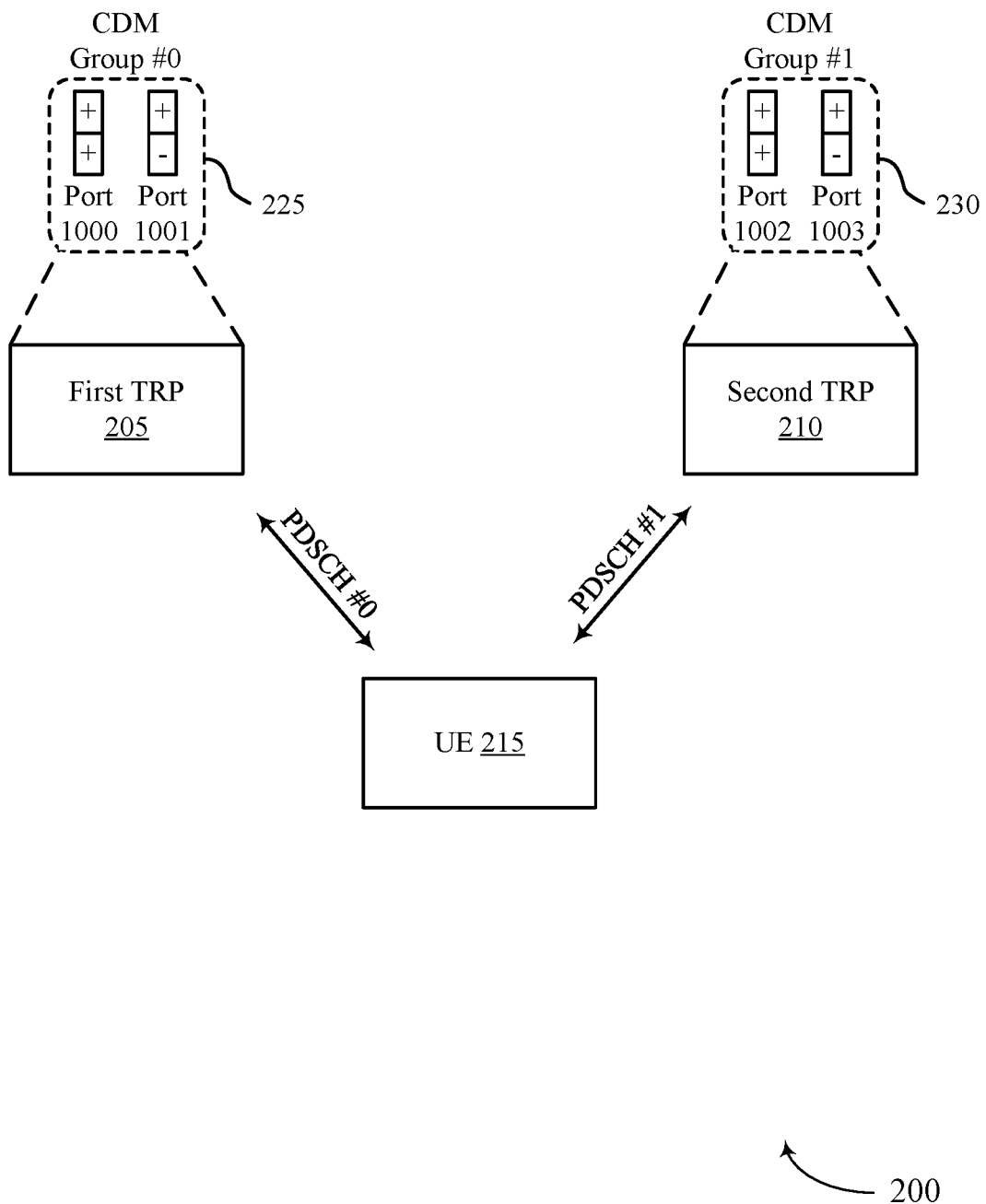
FIG. 2 illustrates an example of a wireless communication system that supports CDM group hopping for multi-TRP, in accordance with one or more aspects of the present disclosure.

FIG. 2 illustrates an example of a wireless communication system 200 that supports CDM group hopping for multi-TRP, in accordance with one or more aspects of the present disclosure. In some examples, wireless communication system 200 may implement aspects of wireless communication system 100. Aspects of wireless communication system 200 may include a first TRP 205, a second TRP 210, and a UE 215, which may be examples of the corresponding devices described with reference to FIG. 1.

In some aspects, the first TRP 205 and the second TRP 210 may be considered serving TRPs of UE 215. Although two TRPs are illustrated in wireless communication system 200, it is to be understood that any number of TRPs may be configured as serving TRPs for UE 215. Accordingly, aspects of the described techniques may be utilized in the situation where three or more TRPs are serving TRPs of UE 215.

In some cases, each of the first TRP 205 and the second TRP 210 may be configured or otherwise associated with a corresponding CDM group. For example, the first TRP 205 may be configured with a first CDM group 225 (e.g., CDM group #0) and the second TRP 210 may be configured with a second CDM group 230 (e.g., CDM group #1). Generally, each CDM group may correspond to one or more antenna ports used for transmitting reference signals (e.g., DMRSs) to UE 215 during a downlink transmission (e.g., PDSCH #0 from the first TRP 205 and PDSCH #1 from the second TRP 210). In some aspects, the PDSCH DMRS within the same CDM group may be quasi-co-located (QCL) with respect to Doppler shift, Doppler spread, average delay, delay spread, spatial reception, and the like.

The CDM groups may be assigned to the respective TRPs for a given downlink transmission to UE 215. For example, configuring UE 215 with multiple TRPs using such techniques may include using semi-static signaling (e.g., RRC and/or MAC control element (CE) signaling) to indicate the TRP-to-CDM group association, which may also be referred to as the CDM group mapping. TRP differentiation using such techniques may include downlink control information (DCI) carrying or otherwise conveying the CDM group information (e.g., as part of an antenna port field) indicating which TRP transmits the associated PDSCH. Table 2 is an example of a table that a UE 115 may reference to determine a DMRS partitioning based on such techniques.

TABLE 2

DMRS Partitioning Table
Semi-Static DMRS Partitioning Without CDM Group Hopping

| RRC (or MAC CE) | Activation of Multi-TRP Mode<br>CDM Group #0 is Assigned to TRP #0<br>CDM Group #1 is Assigned to TRP #1 |
|---|---|
| DCI | CDM Group #1 is Assigned to PDSCH #A |

The information "CDM Group #1" in the DCI indicates to UE 215 that the PDSCH # A comes from TRP #1. The UE may prepare to receive the PDSCH # A by using the receive beam associated with TRP #1.

For the purposes of clarity, CDM Group #0 refers to the first CDM group 225, CDM group #1 refers to the second CDM group 230, TRP #0 refers to the first TRP 205, and TRP #1 refers to the second TRP 210. Moreover, PDSCH may refer to the PDSCH corresponding to the discussed TRP, e.g., refers to PDSCH #0 with reference to the first TRP 205 and PDSCH #1 refers to PDSCH with reference to the second TRP.

However, an interfering TRP may select one of the same CDM groups for downlink transmissions to a different UE 215. This may degrade the decoding performance for the downlink transmissions received by UE 215. Accordingly, aspects of the described techniques may support CDM group hopping between the first TRP 205 and the second TRP 210, which may mitigate interference from the interfering TRP.

In some aspects, the first TRP 205 and the second TRP 210 may coordinate CDM group hopping for UE 215. The coordination between the first TRP 205 and the second TRP 210 may include internal coordination (e.g., when each TRP is implemented at the same base station 205) or external coordination (e.g., when each TRP is implemented at different base stations 205). Such coordination may be performed over a wireline and/or wireless backhaul link between the first TRP 205 and the second TRP 210. In some aspects, the coordination may include the first TRP 205 and the second TRP 210 selecting hopping pattern for the CDM group hopping. In some aspects, the first TRP 205 and/or the second TRP 210 may utilize one or more signals to inform UE 215 that CDM group hopping is enabled and/or to identify the association between CDM group and TRP.

In some examples, the indication of the CDM group hopping may be provided to UE 215 according to a variety of options. Each option may include, at least in some aspects, the UE 215 receiving one or more signals from the first TRP 205, the second TRP 210, or some other entity (e.g., such as a serving base station, a network entity, and the like), indicating that CDM group hopping has been enabled the first TRP 205 and the second TRP 210 and/or identifying the association between the CDM group and TRP.

In some cases, the CDM group hopping pattern may be sent in a semi-static manner (e.g., using RRC and/or MAC CE signaling). In some aspects, the hopping pattern may be configured in terms of mini-slots, slots, subframes, frames, and the like, in a semi-static manner. TRP differentiation according to the first option may be based on the indicated CDM group in DCI (e.g., as part of an antenna ports field) combined with the semi-statically indicated hopping pattern. Table 3 is an example of a table that a UE 215 may reference to determine a DMRS partitioning that supports CDM group hopping according to aspects of the first option.

TABLE 3

DMRS Partitioning Table
Semi-Static DMRS Partitioning with CDM Group Hopping

| RRC (or MAC CE) | Activation of Multi-TRP Mode |
| --- | --- |
| | In the slot set #0 (e.g., even slots) |
| | CDM Group #0 is Assigned to TRP #0 |
| | CDM Group #1 is Assigned to TRP #1 |
| | In the slot set #1 (e.g., the slot set complementary to slot set #0, such as the odd slots) |
| | CDM Group #0 is Assigned to TRP #1 |
| | CDM Group #1 is Assigned to TRP #0 |
| DCI | CDM Group #1 is Assigned to PDSCH #A |

The information "CDM Group #1" combined with the information slot included in slot set #1 in the DCI indicates that the PDSCH # A comes from TRP #0 (PDSCH #0 from the first TRP 205 in this context) in the corresponding odd slot, for example. That is, the DCI indicates the slot index where PDSCH # A is scheduled (the slot index is included in the slot set #1, e.g., the odd slots). The UE 215 may prepare to receive the PDSCH # A (e.g., PDSCH 1) by using the receive beam associated with TRP #0 according to CDM group #1) in the corresponding odd slot (PDSCH #0 from the first TRP 205 in this context). The UE 215 may prepare to receive the PDSCH # A by using the receive beam associated with TRP #1 if the DCI indicates that the PDSCH will be transmitted in a slot included in the slot set #0 (e.g., the even slot) and the CDM group #0 is assigned to the PDSCH. The UE 215 may prepare to receive the PDSCH # A by using the receive beam associated with TRP #0 if the DCI indicates that the PDSCH will be transmitted in a slot included in slot set #0 (e.g., the even slot) and the CDM group #0 is assigned to the PDSCH.

Accordingly, an option may include the UE 215 receiving and decoding a signal (e.g., RRC and/or MAC CE signaling in this option) indicating that CDM group hopping is enabled by indicating the hopping pattern for the CDM group hopping. That is, RRC and/or MAC CE signaling may implicitly indicate that CDM group hopping is enabled by identifying or otherwise indicating the hopping pattern for the CDM group hopping. In some aspects, the signal may identify or otherwise indicate that the first CDM group 225 may be associated with the first TRP 205 and that the second CDM group 230 is associated with the second TRP 210 during a first instance (e.g., one or more of the even slots) of the hopping pattern. In some aspects, the signal may identify or otherwise indicate that the first CDM group 225 is associated with the second TRP 210 and that the second CDM group 230 is associated with the first TRP 205 during a second instance (e.g., one or more of the odd slots) of the hopping pattern.

In some cases, the CDM group mapping (e.g., toggling information regarding CDM group hopping) may be sent in a dynamic manner (e.g., DCI). In some aspects, the hopping pattern may be dynamic, although the coordination between the first TRP 205 and the second TRP 210 may be performed in a semi-static manner. In some aspects, a parameter (e.g., a DMRS port toggling flag) may be included in the DCI that identifies or otherwise indicates that CDM group hopping is enabled. Table 4 is an example of a table that a UE 215 may reference to determine a DMRS partitioning that supports CDM group hopping according to aspects of the second option.

TABLE 4

DMRS Partitioning Table
Semi-Static DMRS Partitioning with CDM Group Hopping

| RRC (or MAC CE) | Activation of Multi-TRP Mode |
| --- | --- |
| | CDM Group #0 is Assigned to TRP #0 |
| | CDM Group #1 is Assigned to TRP #1 |
| DCI | CDM Group #1 is Assigned to PDSCH #A |
| | DMRS Port Toggling Flag (0 or 1) is set to 1 |

The information "CDM Group #1" combined with the information "DMRS port toggling flag set to 1" in the DCI indicates that the PDSCH # A comes from TRP #0. In some aspects, the DMRS port toggling flag information may be valid for the associated PDSCH (e.g., PDSCH # A), and may not affect the PDSCHs from other TRPs. That is, the DMRS port toggling flag may be utilized on a per-instance basis to signal for that instance whether or not the CDM group is toggled. This may provide flexibility in selecting any given CDM group hopping pattern. For example, the DMRS port toggling flag may be set to "1" for one or more instances, and then set to "0" for one or more other instances. This may enable CDM group hopping according to a periodic pattern and/or randomly. The UE 215 may prepare to receive the PDSCH # A by using the receive beam associated with a particular TRP (and associated CDM group, as indicated in the RRC and/or MAC CE) depending on whether or not the DMRS port toggling flag is set to "1" or "0" in a given DCI.

Accordingly, the UE 215 may receive and decoding a signal (e.g., RRC and/or MAC CE signaling in this option) indicating the CDM group mapping, and then receiving and decoding the DCI to identify or otherwise determine that CDM group hopping is enabled (e.g., whether the CDM group mapping is toggled for that instance). The DMRS port toggling flag indicated in any given DCI may carry the indication of the hopping pattern for the CDM group hopping (e.g., may indicate whether the CDM group-to-TRP mapping is toggled for that instance).

In some cases, the CDM group mapping (e.g., toggling information regarding CDM group hopping) may be implicitly indicated in a dynamic manner (e.g., DCI). For example, the hopping pattern may be dynamic, although the coordination between TRPs may be performed in a semi-static manner. In some examples, an antenna port parameter in the DCI may be used by redefining an antenna port mapping table (e.g., because some of the rows in the antenna port mapping table may not be valid in a multi-TRP mode with semi-static DMRS port partitioning). Table 1, reproduced again below for convenience, is an example of a table that UE 215 may reference to determine a DMRS configuration.

TABLE 1

DMRS Configuration Table
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

However, the rows corresponding to values (first column) of 0, 1, 2, and 11, may not be valid for the semi-static DMRS partitioning in the multi-TRP mode. Moreover, if the maximum rank per TRP is limited to two in the semi-static DMRS partitioning for multi-TRP mode, the rows corresponding to values 9 and 10 (again, first column) may be invalid. In some aspects, the rows corresponding to reserved values 12-15 may be used in accordance with aspects of the described techniques.

In some cases, RRC and/or MAC CE signaling may be used to configure the CDM group mapping for UE 215 (e.g., such as indicated in the RRC/MAC CE row of Table 2 above). However, one or more rows of table 1 may be repurposed (or table 1 may be replaced completely) for the multi-TRP mode configured for UE 215. Table 5 is an example of a table that UE 215 may reference to determine a DMRS configuration according to aspects of the third option.

TABLE 5

DMRS Configuration Table
One Codeword:
Codeword 0 enabled,
Codeword 1 disabled

| Value | Number of DMRS CDM group(s) without data | DMRS port(s) | CDM Group Toggling |
|---|---|---|---|
| 0 | 2 | 0 | Yes |
| 1 | 2 | 1 | Yes |
| 2 | 2 | 2 | Yes |
| 3 | 2 | 0 | No |
| 4 | 2 | 1 | No |
| 5 | 2 | 2 | No |
| 6 | 2 | 3 | No |
| 7 | 2 | 0, 1 | No |
| 8 | 2 | 2, 3 | No |
| 9 | 2 | 3 | Yes |
| 10 | 2 | 0, 1 | Yes |
| 11 | 2 | 2, 3 | Yes |
| 12-15 | Reserved | Reserved | |

In Table 5, the values 0, 1, 2, 9, 10, and 11 (which are the counterparts to values 3-8) indicate the relationship between the CDM group and TRP (e.g., the CDM group mapping) is toggled. Accordingly, UE 215 may recover the antenna port parameter value from each DCI (e.g., each instance of the CDM group hopping), and then access Table 5 using the indicated value to identify the CDM group mapping for that instance. For example, values 3, 4, and 7 may indicate that CDM group #0 (DMRS ports 0, 1) may be associated with TRP #0 (e.g., not toggled or as otherwise indicated in the RRC/MAC CE signaling). Values 5, 6, and 8 may indicate that CDM group #1 (DMRS ports 2, 3) are associated with TRP #1 (e.g., not toggled or as otherwise indicated in the RRC/MAC CE signaling). Values 0, 1, and 10 may indicate that CDM group #0 (DMRS ports 0, 1) are associated with TRP #1 (e.g., are toggled). Values 2, 9, and 11 may indicate that CDM group #1 (DMRS ports 2, 3) are associated with TRP #0 (e.g., are toggled).

Accordingly, the third option may include the UE 215 receiving and decoding a signal (e.g., RRC and/or MAC CE signaling in this option) indicating the CDM group mapping, and then receiving and decoding the DCI to identify or otherwise determine that CDM group hopping is enabled. The value indicated in the antenna port mapping field indicated in any given DCI may carry the indication of the hopping pattern for the CDM group hopping (e.g., may indicate whether the CDM group-to-TRP mapping is toggled) for that instance.

When CDM group hopping is enabled, the first TRP 205 may transmit a first reference signal (e.g., DMRS) according to the first CDM group 225 (e.g., CDM group #0) and the second TRP 210 may transmit a second reference signal (e.g., DMRS) according to the second CDM group 220 (e.g., CDM group #1) during a first instance of the CDM group hopping. During the next instance of the CDM group hopping, the first TRP 205 may transmit the first reference signal according to the second CDM group 230 (e.g., CDM group #1) and the second TRP 210 may transmit the second reference signal according to the first CDM group 225 (e.g., CDM group #0). The first TRP 205, the second TRP 210, and/or UE 215 may know, for any given instance of the CDM group hopping, which CDM group is associated with which TRP based on signaling as described herein.

In some aspects, UE 215 may consider a Ko value which is associated with the delay between DCI and PDSCH. For example, UE 215 may consider the Ko value when determining when to monitor for and/or receive PDSCH (and the corresponding DMRS) transmissions from the first TRP 205 and/or the second TRP 210.

As discussed, references to an instance may be referred to a mini slot, a slot, a subframe, frame, and the like. For example, the CDM group hopping may occur for a given downlink data transmission occurring over multiple slots, where the CDM group mapping may be toggled from one slot to the next, every second slot, the third slot, or any other pattern.

Figure 3:
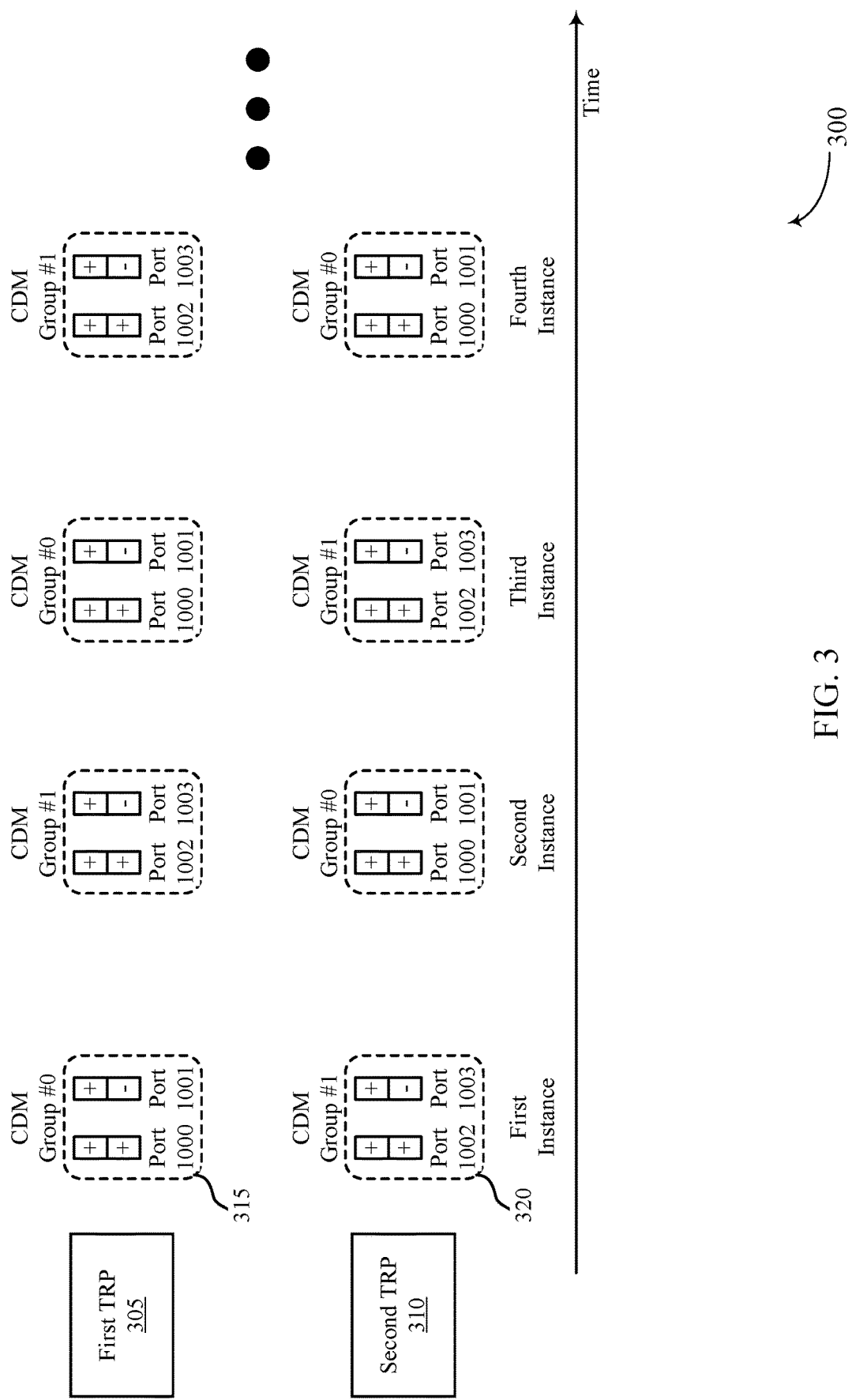
FIG. 3 illustrates an example of a timeline that supports CDM group hopping for multi-TRP, in accordance with one or more aspects of the present disclosure.

FIG. 3 illustrates an example of a timeline 300 that supports CDM group hopping for multi-TRP, in accordance with one or more aspects of the present disclosure. In some examples, timeline 300 may implement aspects of wireless communication systems 100 and/or 200. Aspects of timeline 300 may be implemented by a first TRP 305 and a second TRP 310, which may be examples of corresponding devices described herein. In some aspects, the first TRP 305 and the second TRP 310 may be serving TRPs for a UE.

In some examples, timeline 300 illustrates a hopping pattern that may be implemented in CDM group hopping according to aspects of the described techniques. For example, the first TRP 305 and the second TRP 310 may coordinate CDM group hopping for a UE. The coordination may be performed internally (e.g., when both TRPs are implemented in a single base station) or externally (e.g., over a wired and/or a wireless backhaul link when both TRPs are implemented in separate base stations). The UE may determine or otherwise identify the association between the CDM group and the TRP (e.g., the CDM group mapping) according to any of the techniques discussed herein. Moreover, the UE may receive a signal indicating that CDM group hopping has been enabled for the UE from the first TRP 305 and the second TRP 310.

Thus, according to timeline 300, the CDM group hopping may be enabled based on a hopping pattern. In some cases, the hopping pattern may include the first TRP 305 transmitting DMRS (as part of, or in conjunction with PDSCH) to the UE during a first instance according to the first CDM group 315 (e.g., CDM group #0, using ports 1000 and 1001) and the second TRP 310 transmitting DMRS (as part of, or in conjunction with PDSCH) to the UE during the first instance according to the second CDM group 320 (e.g., CDM group #1, using ports 1002 and 1003). During the second instance of the hopping pattern, the first TRP 305 may transmit the DMRS to the UE according to the second CDM group 320 while the second TRP 310 transmits DMRS to the UE according to the first CDM group 315. During the third instance of the hopping pattern, the first TRP 305 may again transmit DMRS to the UE according to the first CDM group 315 while the second TRP 310 transmits DMRS to the UE according to the second CDM group 320. In some cases, during the fourth instance of the hopping pattern the first TRP 305 may transmit DMRS to the UE according to the second CDM group 320 while the second TRP 310 transmits DMRS to the UE according to the first CDM group 315.

Although timeline 300 illustrates an example of a hopping pattern from two TRPs, it is to be understood that the described techniques are not limited to a multi-TRP situation where two TRPs serve the UE. For example, the first TRP 305 and/or the second TRP 310 may coordinate with a third TRP (not shown) for CDM group hopping for the UE. In this example, a third CDM group may be associated with the third TRP, which may then be included in the hopping pattern of the CDM group. For example, the first TRP 305 may transmit DMRS to the UE according to the third CDM group during the third instance of the hopping pattern, with the second TRP 310 transmitting DMRS to the UE according to the third CDM group during the 4th instance of the hopping pattern. Additional TRPs, with associated and/or shared CDM groups, may be included in the CDM group hopping in accordance with aspects of the described techniques.

Figure 4:
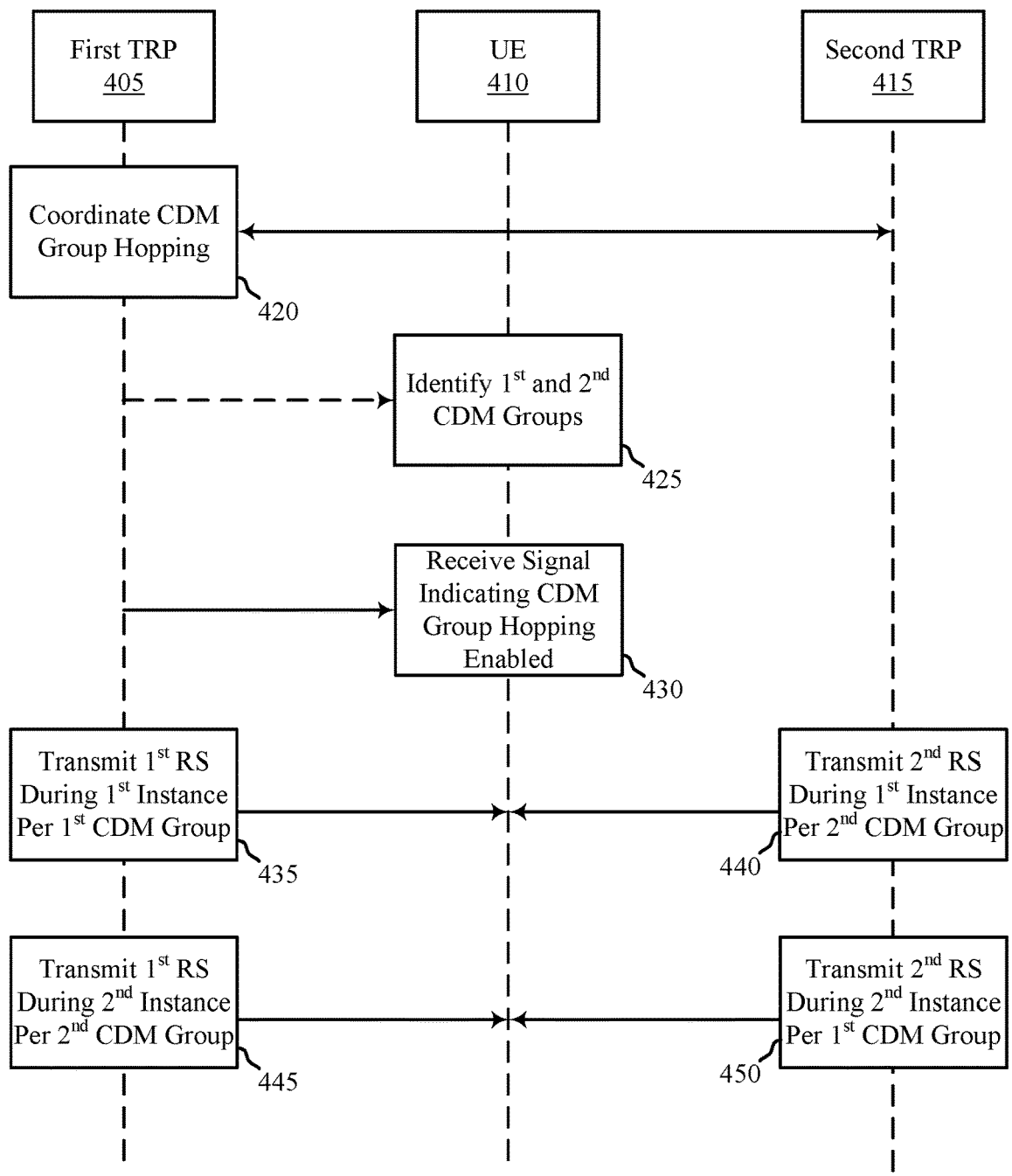
FIG. 4 illustrates an example of a process that supports CDM group hopping for multi-TRP, in accordance with one or more aspects of the present disclosure.

FIG. 4 illustrates an example of a process 400 that supports CDM group hopping for multi-TRP, in accordance with one or more aspects of the present disclosure. In some examples, process 400 may implement aspects of wireless communication systems 100, 200, and/or timeline 300. Aspects of process 400 may be implemented by a first TRP 405, UE 410, and/or a second TRP 415, which may be examples of the corresponding devices described herein.

At 420, the first TRP 405 and the second TRP 415 may coordinate to configure CDM group hopping for UE 410. When the first TRP 405 and the second TRP 415 are implemented at a single base station, the coordination may be internally coordinated by the base station. When the first TRP 405 and the second TRP 415 are implemented at separate base stations the coordination may be performed over a wireline and/or a wireless backhaul link between the base stations.

At 425, UE 410 may identify a first CDM group associated with the first TRP 405 and a second CDM group associated with the second TRP 415 (e.g., the CDM group mapping). In some examples, UE 410 may identify the CDM group mapping by receiving a signal (e.g., from the first TRP 405 as shown, or from the second TRP 415) identifying the CDM group mapping. In some examples, the signal may include an RRC signal and/or a MAC CE signal that identifies the CDM group mapping. In other options, the signal may be DCI.

At 430, UE 410 may receive (and the first TRP 405 may transmit, for example), a signal indicating that CDM group hopping is enabled for the first TRP 405 and the second TRP 415. In some aspects, the signal may include an RRC, a MAC CE signal, a DCI signal, and the like, as is described with reference to FIG. 2.

In some aspects, this may include UE 410 decoding the signal indicating that CDM group hopping is enabled to identify or otherwise determine that the first CDM group may be associated with the first TRP 405 and that the second CDM group may be associated with the second TRP 415. For example, the signal may include RRC signaling and/or MAC CE signaling that carries or otherwise conveys an indication of a hopping pattern CDM group hopping. In this context, the first instance and the second instance may correspond to the hopping pattern indicated in the signal.

In some aspects, this may include UE 410 decoding an RRC signal and/or a MAC CE signal to identify or otherwise determine that the first CDM group may be associated with the first TRP 405 and that the second CDM group may be associated with a second TRP 415. UE 410 may also receive and decode the DCI during each instance of the CDM group hopping that indicates that CDM group hopping is enabled. UE 410 may determine or otherwise identify the hopping pattern for the CDM group hopping based on the DCIs received during each instance of the CDM group hopping. In some aspects, each DCI may carry or convey a DMRS port toggling flag that identifies or otherwise indicates that CDM group hopping is enabled for that instance (e.g., the instance in which the DCI is received). UE 410 may determine the hopping pattern (e.g., whether the CDM group mapping is toggled) based on how the DMRS port toggling flag is set in each DCI. In some aspects, this may correspond to option 2 discussed herein.

In some aspects, this may include UE 410 receiving and decoding the DCI that identifies or otherwise indicates that CDM hopping is enabled for UE 410. For example, the DCI received in each instance of the CDM group hopping may carry or otherwise convey an indication of an antenna port parameter value. UE 410 may use the antenna port parameter value indicated in each DCI when accessing an antenna port mapping table to determine whether the first CDM group is associated with the first TRP 405 or the second TRP 415 during that instance. Similarly, UE 410 may use the antenna port parameter value indicated in each DCI when accessing the antenna port mapping table to determine whether the second CDM group is associated with the first TRP 405 or the second TRP 415 during that instance.

As discussed herein, each instance of the CDM group hopping may refer to a time period within the hopping pattern in which a particular CDM group is associated with a particular TRP. Examples of instances may include, but are not limited to, a mini slot, a slot a subframe, a frame, and the like. A periodicity of the CDM group hopping may refer to two instances (or more instances when more than two TRPs serve UE 410) of the hopping pattern.

At 435, during a first instance of the CDM group hopping the first TRP 405 may transmit (and UE 410 may receive) a first reference signal (e.g., DMRS) according to the first CDM group. In some aspects, this may include receiving the first reference signal over one or more ports associated with the first CDM group. In some aspects, the first reference signal may be transmitted in conjunction with a PDSCH transmission from the first TRP 405 to UE 410.

At 440 during the first instance of the CDM group hopping, the second TRP 415 may transmit (and UE 410 may receive) a second reference signal (e.g., a DMRS) according to a second CDM group. In some aspects, this may include receiving the second reference signal over one or more ports associated with the second CDM group. In some aspects, the second reference signal may be transmitted in conjunction with the PDSCH transmission from the second TRP 415 to UE 410.

At 445, during a second instance of the CDM group hopping, the first TRP 405 may transmit (and UE 410 may receive) the first reference signal according to the second CDM group. At 450, during the second instance of the CDM group hopping the second TRP 415 may transmit (and UE 410 may receive) the second reference signal according to the first CDM group. Thus, CDM group hopping may be implemented by the first TRP 405 and the second TRP 415 for UE 410.

Aspects of the described techniques may be implemented with any number of TRPs serving UE 410. For example, the first TRP 405 may coordinate with a third TRP (not shown) to enable or otherwise configure CDM group hopping for UE 410. In this context, a third CDM group may be associated with the third TRP and be cycled into the hopping pattern of the CDM group hopping. For example, the first TRP 405 may use the first CDM group, the second TRP 415 may utilize the second CDM group, and the third TRP may utilize third TRP for transmitting respective reference signals to UE 410 during the first instance of the CDM group hopping. During the second instance of the CDM group hopping, the first TRP 405 may use the third CDM group, the second TRP 415 may use the first CDM group, and the third TRP may use the second CDM group for transmitting respective reference signals to UE 410. In some cases, during the third instance of the CDM group hopping, the first TRP 405 may use the second CDM group, the second TRP 415 may use the third CDM group, and the third TRP may use the first CDM group for transmitting respective reference signals to UE 410. It is to be understood that other hopping patterns may be implemented for CDM group hopping for UE 410.

Figure 5:
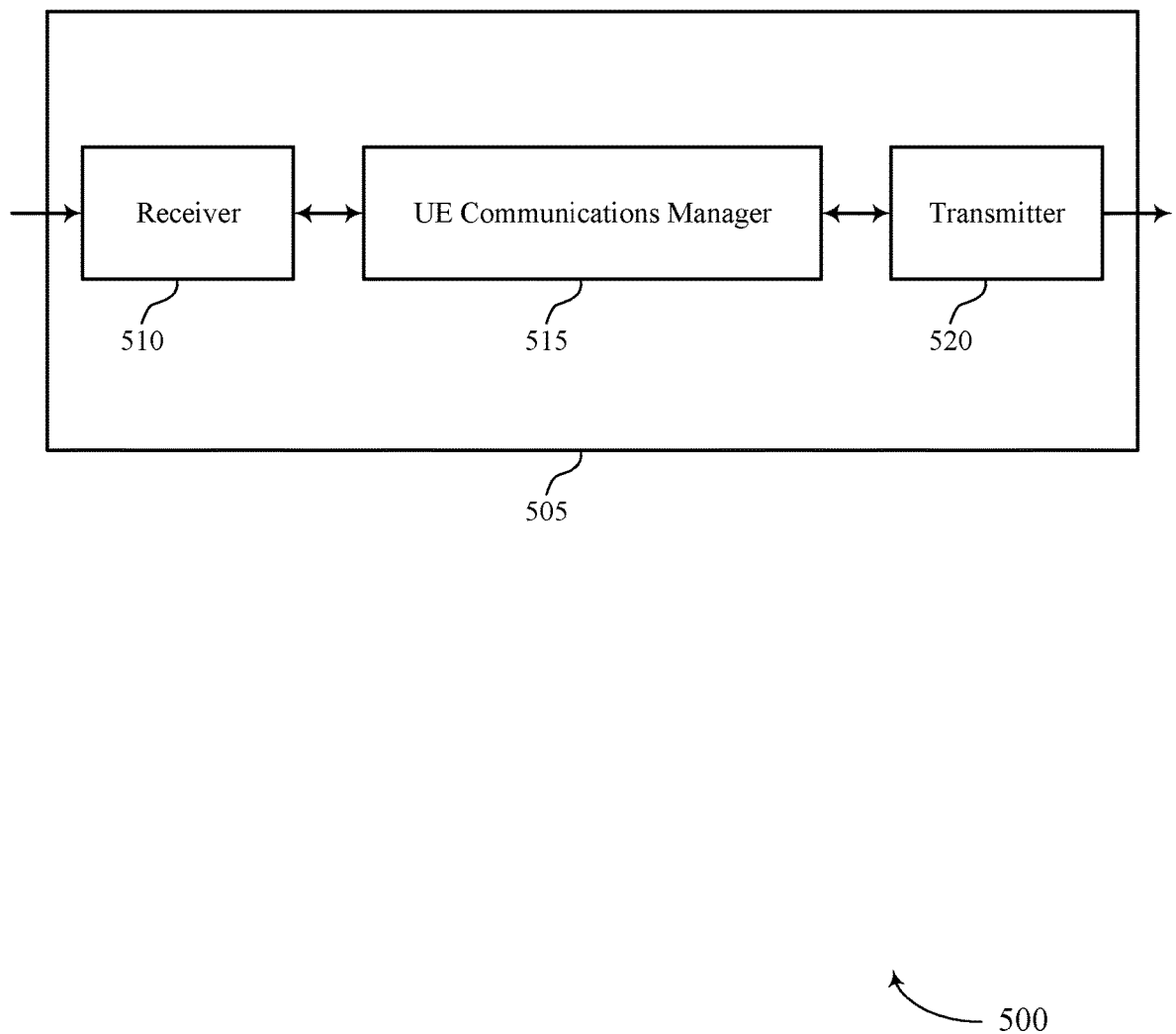
FIGS. 5 and 6 show block diagrams of devices that support CDM group hopping for multi-TRP, in accordance with one or more aspects of the present disclosure.

FIG. 5 shows a block diagram 500 of a device 505 that supports CDM group hopping for multi-TRP, in accordance with one or more aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to CDM group hopping for multi-TRP, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may determine a first CDM group associated with a first TRP and a second CDM group associated with a second TRP, receive a signal indicating that CDM group hopping is enabled for the first TRP and the second TRP, receive, during a first instance of the CDM group hopping, a first reference signal from the first TRP according to the first CDM group and a second reference signal from the second TRP according to the second CDM group, and receive, during a second instance of the CDM group hopping, the first reference signal from the first TRP according to the second CDM group and the second reference signal from the second TRP according to the first CDM group. The UE communications manager 515 may be an example of aspects of the UE communications manager 810 described herein.

The actions performed by the communications manager 515 as described herein may support improvements in interference. In one or more aspects, TRPs may coordinate CDM group hopping parameters for a UE. Coordinating group hopping may enable techniques for reducing interference between hidden TRPs and TRPs serving the UE, which may result in more efficient communications (e.g., decreased latency in the system), among other improvements.

Based on coordinated group hopping as described herein, a processor of a UE or base station (e.g., a processor controlling the receiver 510, the communications manager 515, the transmitter 520, or a combination thereof) may improve system complexity while ensuring relatively efficient communications. For example, the group hopping techniques described herein may change a CDM group associated with a TRP, which may realize reduced signaling overhead and power savings, among other benefits.

The UE communications manager 515, or its sub-components, may be implemented in hardware, code (e.g., software or firmware) executed by a processor, or any combination thereof. If implemented in code executed by a processor, the functions of the UE communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
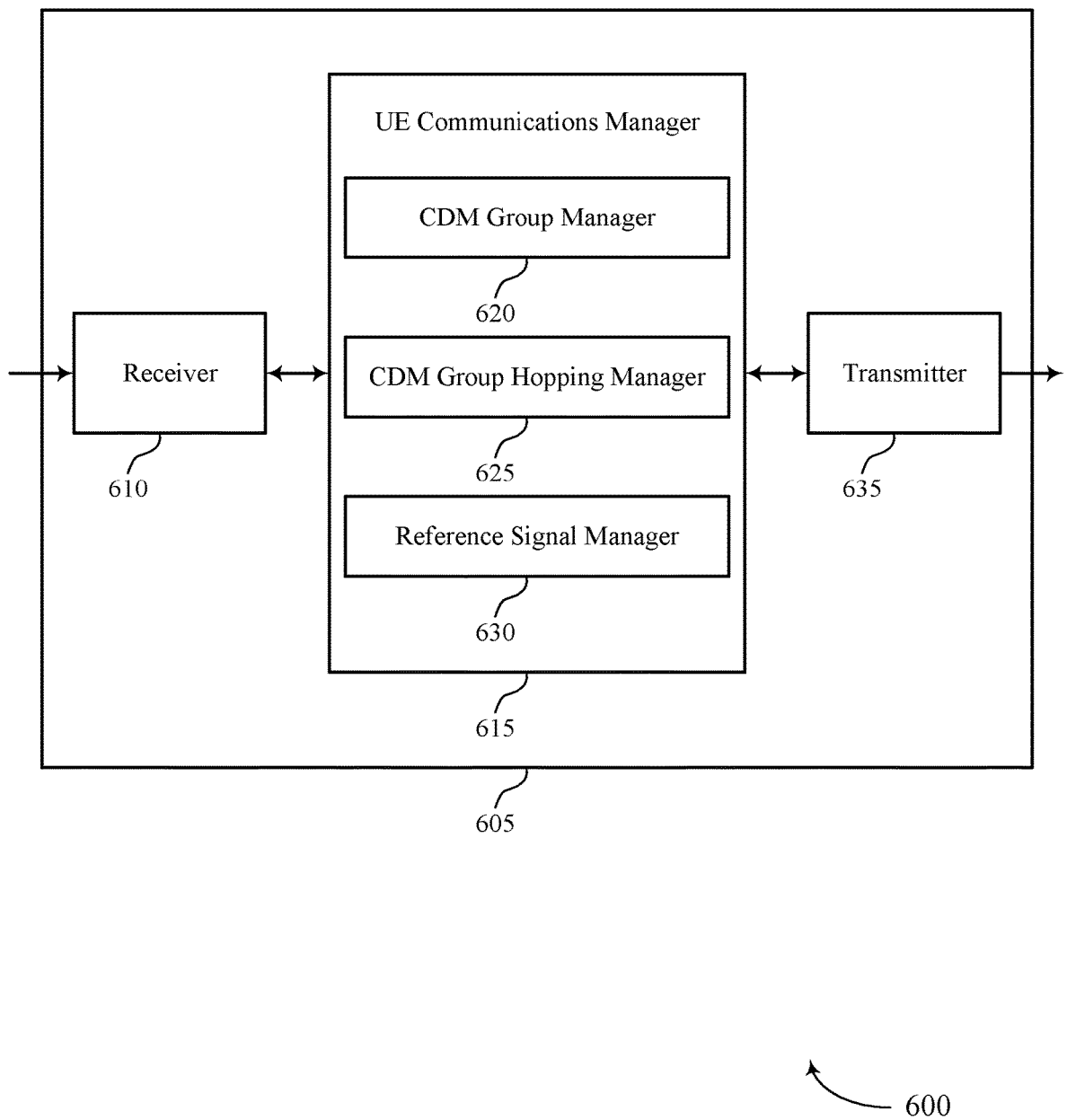

FIG. 6 shows a block diagram 600 of a device 605 that supports CDM group hopping for multi-TRP, in accordance with one or more aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to CDM group hopping for multi-TRP, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a CDM group manager 620, a CDM group hopping manager 625, and a reference signal manager 630. The UE communications manager 615 may be an example of aspects of the UE communications manager 810 described herein.

The CDM group manager 620 may determine a first CDM group associated with a first TRP and a second CDM group associated with a second TRP.

The CDM group hopping manager 625 may receive a signal indicating that CDM group hopping is enabled for the first TRP and the second TRP.

The reference signal manager 630 may receive, during a first instance of the CDM group hopping, a first reference signal from the first TRP according to the first CDM group and a second reference signal from the second TRP according to the second CDM group and receive, during a second instance of the CDM group hopping, the first reference signal from the first TRP according to the second CDM group and the second reference signal from the second TRP according to the first CDM group.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
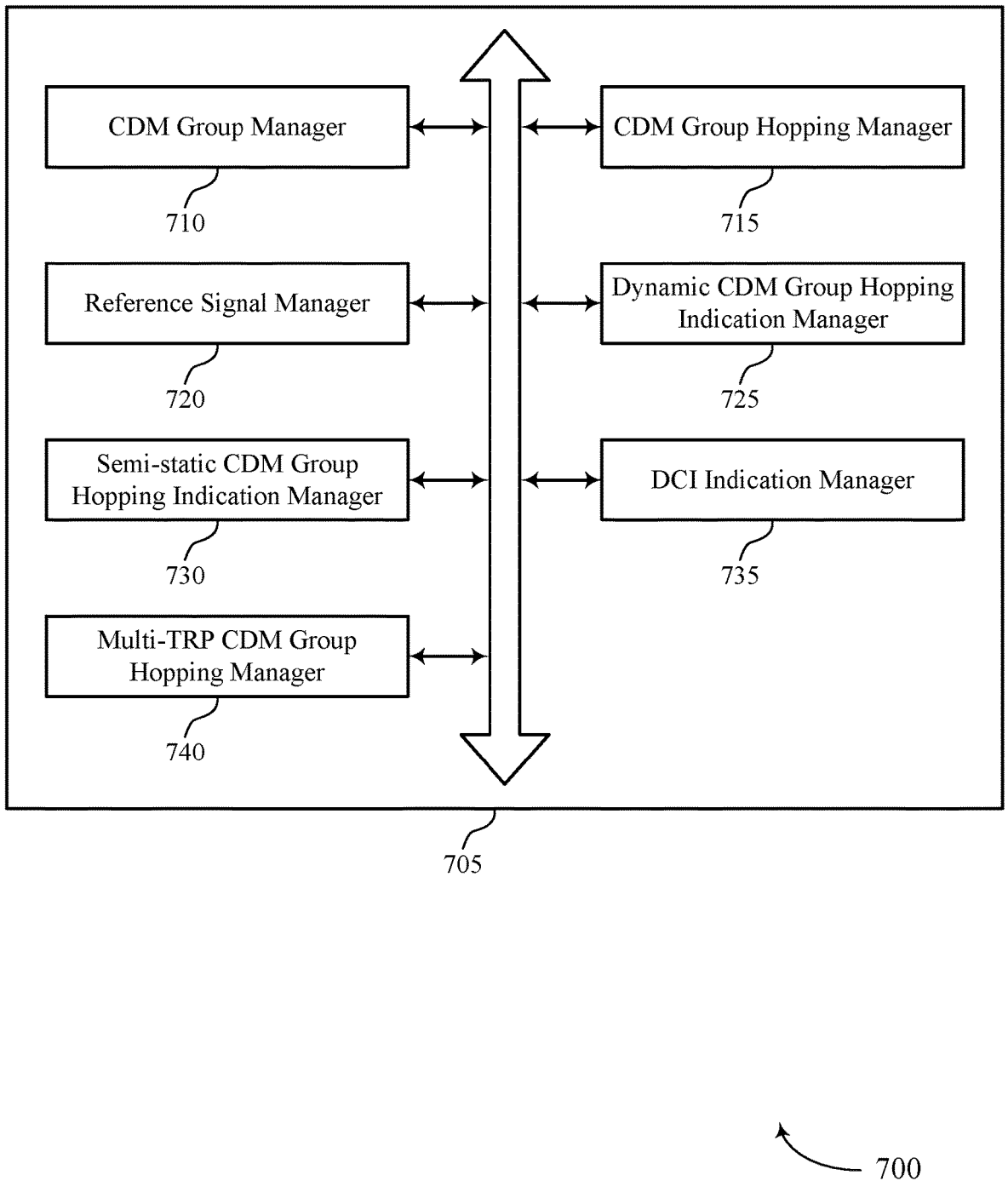
FIG. 7 shows a block diagram of a communications manager that supports CDM group hopping for multi-TRP, in accordance with one or more aspects of the present disclosure.

FIG. 7 shows a block diagram 700 of a UE communications manager 705 that supports CDM group hopping for multi-TRP, in accordance with one or more aspects of the present disclosure. The UE communications manager 705 may be an example of aspects of a UE communications manager 515, a UE communications manager 615, or a UE communications manager 810 described herein. The UE communications manager 705 may include a CDM group manager 710, a CDM group hopping manager 715, a reference signal manager 720, a dynamic CDM group hopping indication manager 725, a semi-static CDM group hopping indication manager 730, a DCI indication manager 735, and a multi-TRP CDM group hopping manager 740. Each of these modules may communicate, directly or indirectly, with one another (e.g., via one or more buses).

The CDM group manager 710 may determine a first CDM group associated with a first TRP and a second CDM group associated with a second TRP.

The CDM group hopping manager 715 may receive a signal indicating that CDM group hopping is enabled for the first TRP and the second TRP.

The reference signal manager 720 may receive, during a first instance of the CDM group hopping, a first reference signal from the first TRP according to the first CDM group and a second reference signal from the second TRP according to the second CDM group. In some examples, the reference signal manager 720 may receive, during a second instance of the CDM group hopping, the first reference signal from the first TRP according to the second CDM group and the second reference signal from the second TRP according to the first CDM group.

The dynamic CDM group hopping indication manager 725 may decode the signal indicating that CDM group hopping is enabled to identify the first CDM group and the second CDM group. In some cases, the signal includes at least one of an RRC signal, a MAC CE, or a combination thereof. In some cases, the signal indicates a hopping pattern for the CDM group hopping, and the first instance and the second instance are based on the hopping pattern.

The semi-static CDM group hopping indication manager 730 may decode at least one of an RRC signal, a MAC CE, or a combination thereof, to identify the first CDM group and the second CDM group. In some examples, the semi-static CDM group hopping indication manager 730 may decode, for each of the first instance and the second instance, a DCI to identify the indication that CDM hopping is enabled and to identify a hopping pattern for the CDM group hopping. In some examples, the semi-static CDM group hopping indication manager 730 may decode, for each of the first instance and the second instance, a DMRS port toggling flag of the DCI to identify the indication that CDM group hopping is enabled.

The DCI indication manager 735 may decode, for each of the first instance and the second instance, a DCI to identify the indication that CDM hopping is enabled. In some examples, the DCI indication manager 735 may recover, for each of the first instance and the second instance, an antenna port parameter value from the DCI. In some examples, the DCI indication manager 735 may access, using the antenna port parameter value, an antenna port mapping table to identify the first CDM group associated with the first TRP and the second CDM group associated with the second TRP.

The multi-TRP CDM group hopping manager 740 may identify a third CDM group associated with a third TRP. In some examples, the multi-TRP CDM group hopping manager 740 may receive, during a third instance of the CDM group hopping, a third reference signal from the third TRP according to the third CDM group.

Figure 8:
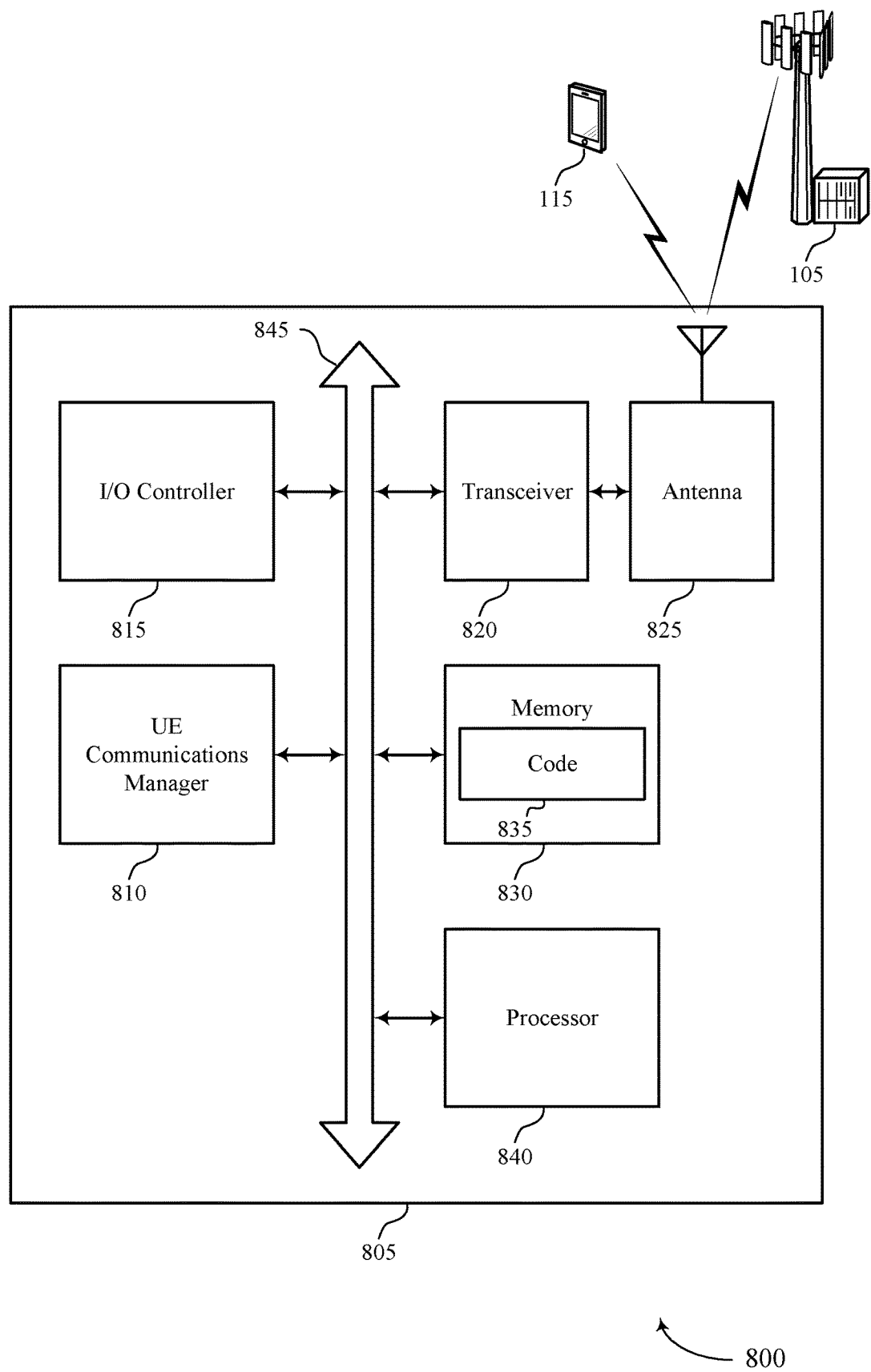
FIG. 8 shows a diagram of a system including a device that supports CDM group hopping for multi-TRP, in accordance with one or more aspects of the present disclosure.

FIG. 8 shows a diagram of a system 800 including a device 805 that supports CDM group hopping for multi-TRP, in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may determine a first CDM group associated with a first TRP and a second CDM group associated with a second TRP, receive a signal indicating that CDM group hopping is enabled for the first TRP and the second TRP, receive, during a first instance of the CDM group hopping, a first reference signal from the first TRP according to the first CDM group and a second reference signal from the second TRP according to the second CDM group, and receive, during a second instance of the CDM group hopping, the first reference signal from the first TRP according to the second CDM group and the second reference signal from the second TRP according to the first CDM group.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting CDM group hopping for multi-TRP).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
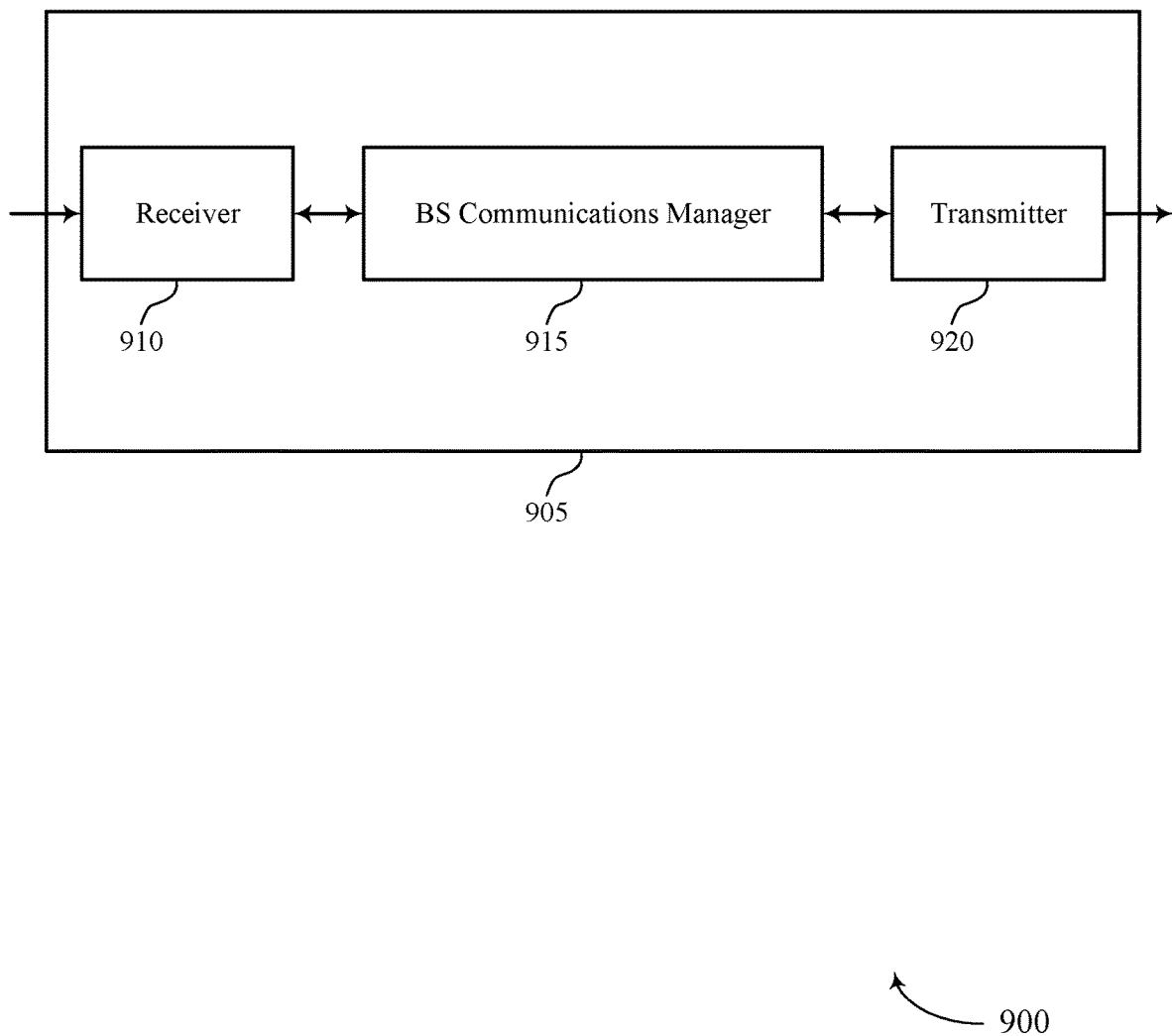
FIGS. 9 and 10 show block diagrams of devices that support CDM group hopping for multi-TRP, in accordance with one or more aspects of the present disclosure.

FIG. 9 shows a block diagram 900 of a device 905 that supports CDM group hopping for multi-TRP, in accordance with one or more aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to CDM group hopping for multi-TRP, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may coordinate with a second TRP to configure CDM group hopping for a UE, transmit a signal to the UE indicating that CDM group hopping is enabled for the first TRP and the second TRP, transmit, during a first instance of the CDM group hopping, a first reference signal to the UE according to a first CDM group, and transmit, during a second instance of the CDM group hopping, the first reference signal to the UE according to a second CDM group. The base station communications manager 915 may be an example of aspects of the base station communications manager 1210 described herein.

The base station communications manager 915, or its sub-components, may be implemented in hardware, code (e.g., software or firmware) executed by a processor, or any combination thereof. If implemented in code executed by a processor, the functions of the base station communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
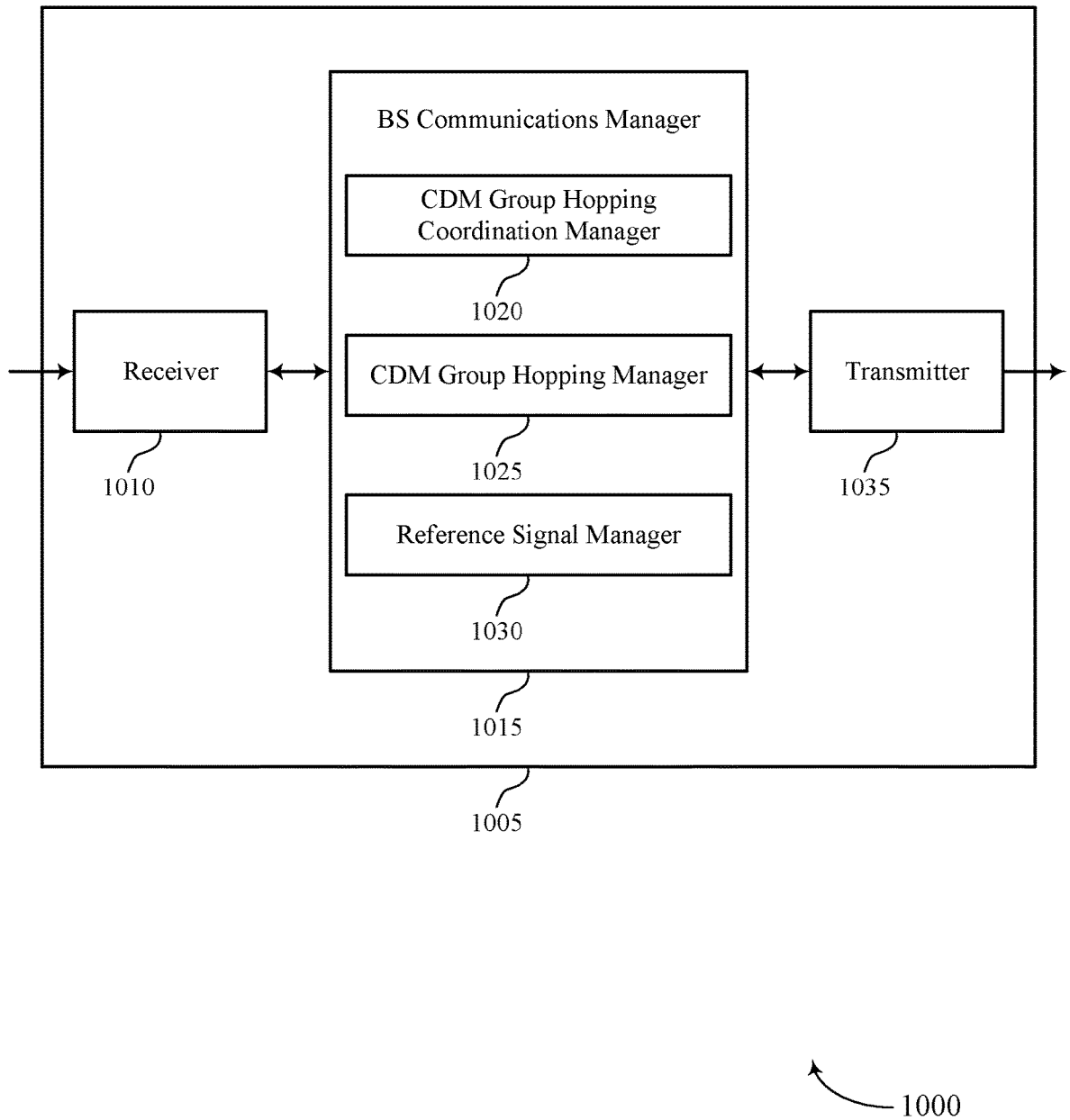

FIG. 10 shows a block diagram 1000 of a device 1005 that supports CDM group hopping for multi-TRP, in accordance with one or more aspects of the present disclosure. The device 1005 may be an example of aspects of a device 905, or a base station 105 as described herein. The device 1005 may include a receiver 1010, a base station communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to CDM group hopping for multi-TRP, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a CDM group hopping coordination manager 1020, a CDM group hopping manager 1025, and a reference signal manager 1030. The base station communications manager 1015 may be an example of aspects of the base station communications manager 1210 described herein.

The CDM group hopping coordination manager 1020 may coordinate with a second TRP to configure CDM group hopping for a UE.

The CDM group hopping manager 1025 may transmit a signal to the UE indicating that CDM group hopping is enabled for the first TRP and the second TRP.

The reference signal manager 1030 may transmit, during a first instance of the CDM group hopping, a first reference signal to the UE according to a first CDM group and transmit, during a second instance of the CDM group hopping, the first reference signal to the UE according to a second CDM group.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
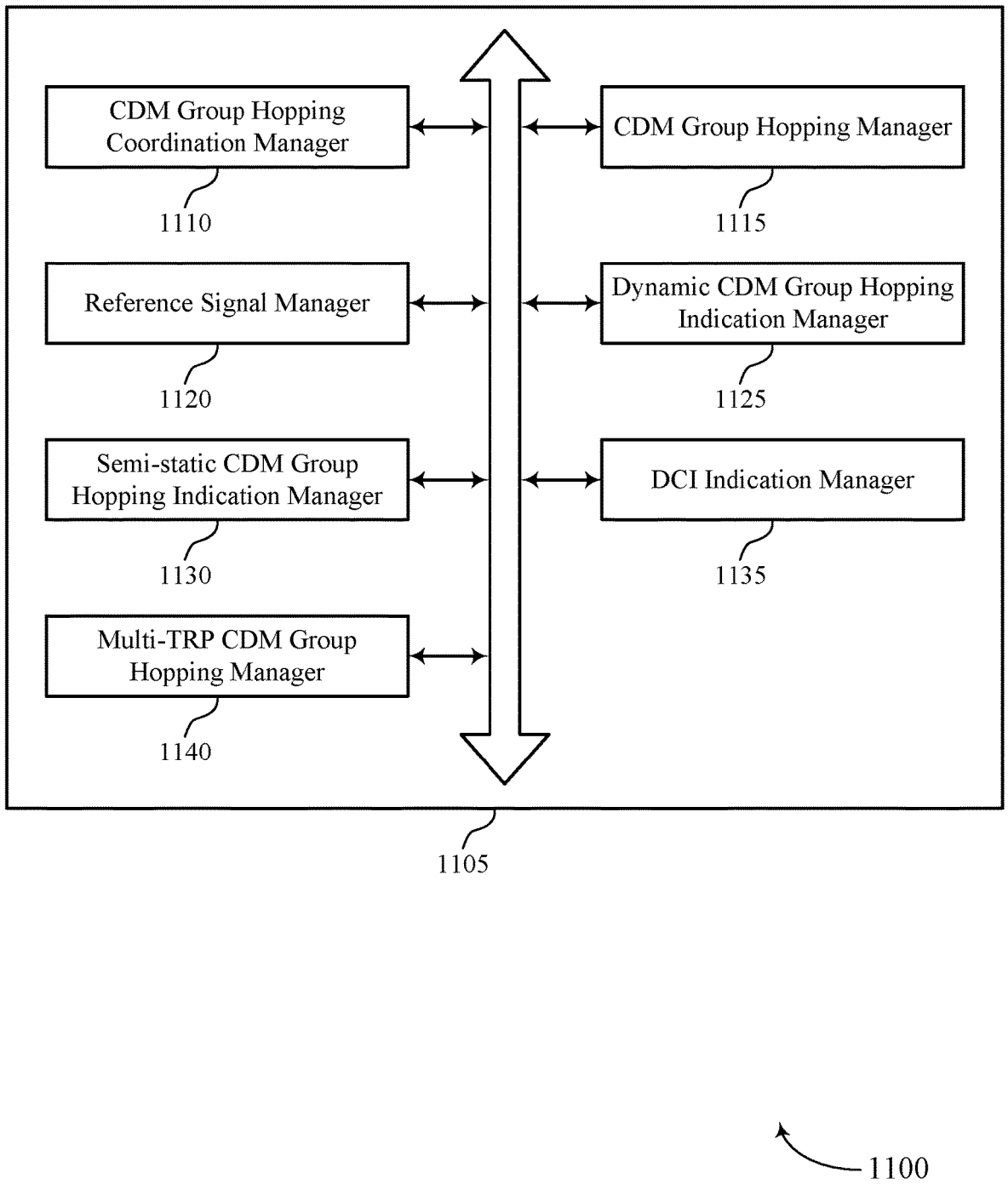
FIG. 11 shows a block diagram of a communications manager that supports CDM group hopping for multi-TRP, in accordance with one or more aspects of the present disclosure.

FIG. 11 shows a block diagram 1100 of a base station communications manager 1105 that supports CDM group hopping for multi-TRP, in accordance with one or more aspects of the present disclosure. The base station communications manager 1105 may be an example of aspects of a base station communications manager 915, a base station communications manager 1015, or a base station communications manager 1210 described herein. The base station communications manager 1105 may include a CDM group hopping coordination manager 1110, a CDM group hopping manager 1115, a reference signal manager 1120, a dynamic CDM group hopping indication manager 1125, a semi-static CDM group hopping indication manager 1130, a DCI indication manager 1135, and a multi-TRP CDM group hopping manager 1140. Each of these modules may communicate, directly or indirectly, with one another (e.g., via one or more buses).

The CDM group hopping coordination manager 1110 may coordinate with a second TRP to configure CDM group hopping for a UE.

The CDM group hopping manager 1115 may transmit a signal to the UE indicating that CDM group hopping is enabled for the first TRP and the second TRP.

The reference signal manager 1120 may transmit, during a first instance of the CDM group hopping, a first reference signal to the UE according to a first CDM group. In some examples, the reference signal manager 1120 may transmit, during a second instance of the CDM group hopping, the first reference signal to the UE according to a second CDM group.

The dynamic CDM group hopping indication manager 1125 may encode the signal indicating that CDM group hopping is enabled to identify the first CDM group and the second CDM group. In some cases, the signal includes at least one of an RRC signal, a MAC CE, or a combination thereof. In some cases, the signal indicates a hopping pattern for the CDM group hopping, and the first instance and the second instance are based on the hopping pattern.

The semi-static CDM group hopping indication manager 1130 may encode at least one of an RRC signal, a MAC CE, or a combination thereof, to indicate the first CDM group and the second CDM group. In some examples, the semi-static CDM group hopping indication manager 1130 may encode, for each of the first instance and the second instance, a DCI to indicate that CDM hopping is enabled and to indicate a hopping pattern for the CDM group hopping. In some examples, the semi-static CDM group hopping indication manager 1130 may encode, for each of the first instance and the second instance, a DMRS port toggling flag of the DCI to indicate that CDM group hopping is enabled.

The DCI indication manager 1135 may encode, for each of the first instance and the second instance, a DCI to indicate that CDM hopping is enabled. In some examples, the DCI indication manager 1135 may encode, for each of the first instance and the second instance, an antenna port parameter value of the DCI to indicate the first CDM group associated and the second CDM group.

The multi-TRP CDM group hopping manager 1140 may coordinate with a third TRP to configure the CDM group hopping for the UE. In some examples, the multi-TRP CDM group hopping manager 1140 may transmit, during a third instance of the CDM group hopping, the first reference signal to the UE according to a third CDM group.

Figure 12:
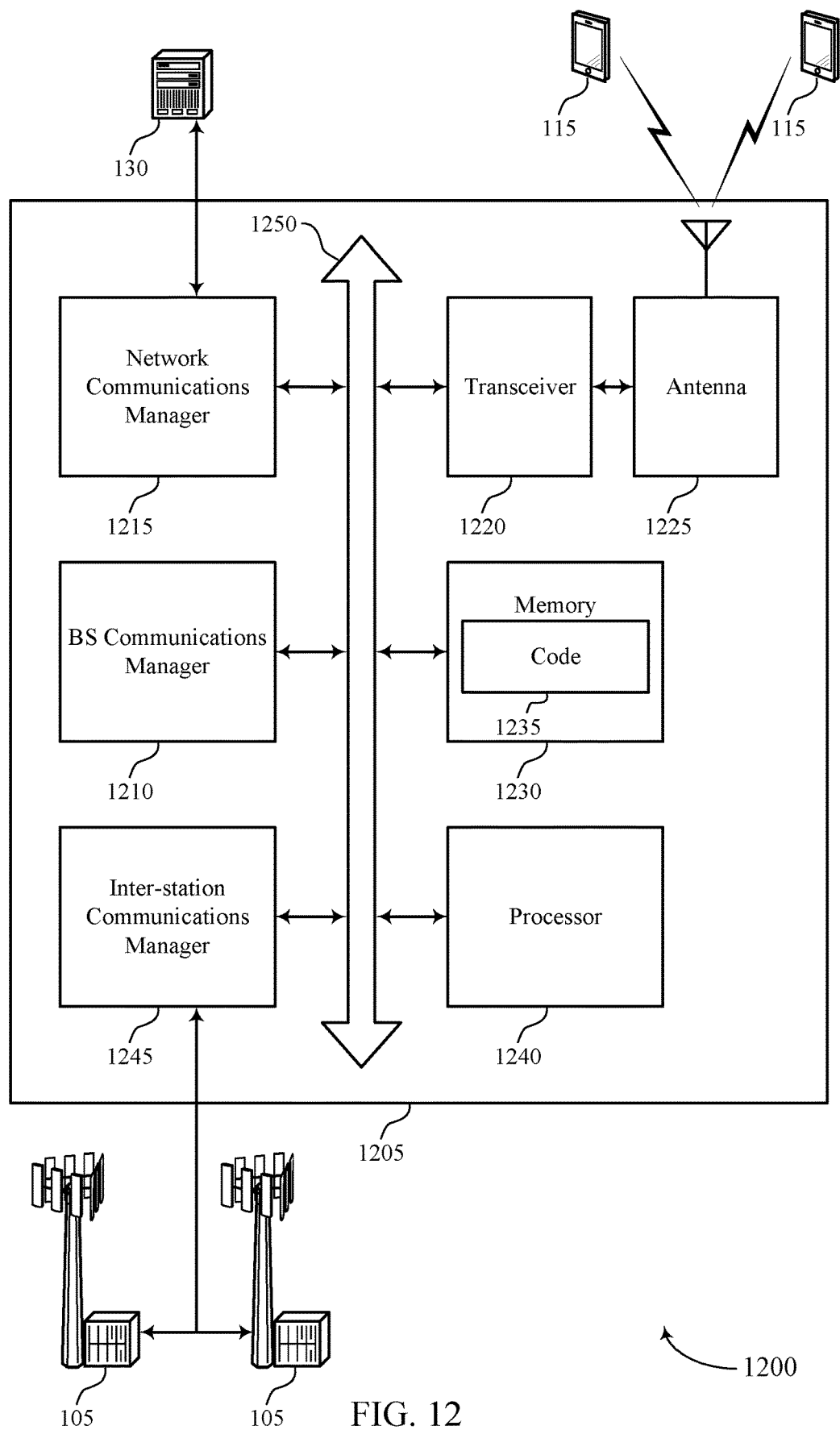
FIG. 12 shows a diagram of a system including a device that supports CDM group hopping for multi-TRP, in accordance with one or more aspects of the present disclosure.

FIG. 12 shows a diagram of a system 1200 including a device 1205 that supports CDM group hopping for multi-TRP, in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may coordinate with a second TRP to configure CDM group hopping for a UE, transmit a signal to the UE indicating that CDM group hopping is enabled for the first TRP and the second TRP, transmit, during a first instance of the CDM group hopping, a first reference signal to the UE according to a first CDM group, and transmit, during a second instance of the CDM group hopping, the first reference signal to the UE according to a second CDM group.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting CDM group hopping for multi-TRP).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
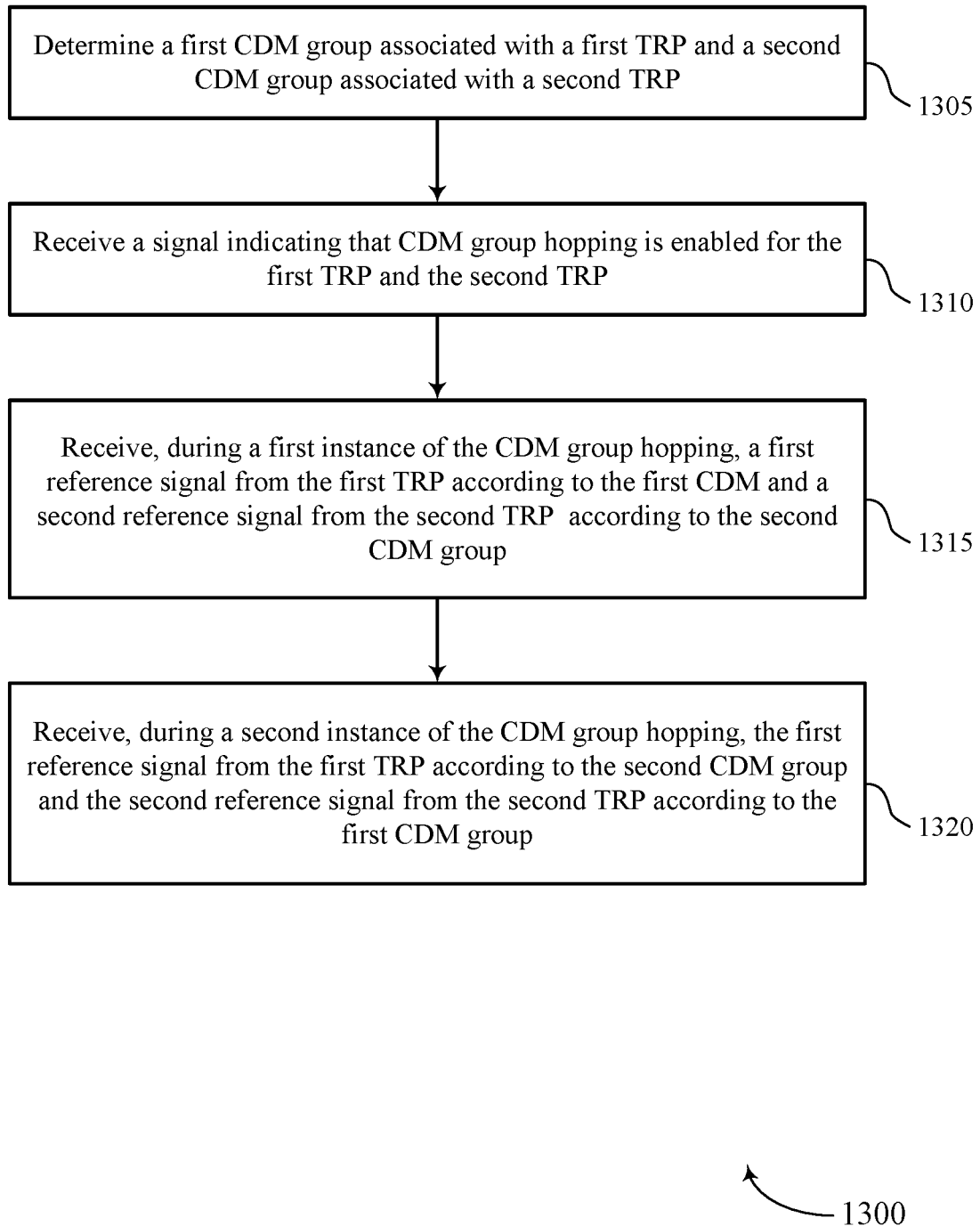
FIGS. 13 through 17 show flowcharts illustrating methods that support CDM group hopping for multi-TRP, in accordance with one or more aspects of the present disclosure.

FIG. 13 shows a flowchart illustrating a method 1300 that supports CDM group hopping for multi-TRP, in accordance with one or more aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may determine a first CDM group associated with a first TRP and a second CDM group associated with a second TRP. The operations of 1305 may be performed according to the methods described herein. In some examples, aspects of the operations of 1305 may be performed by a CDM group manager as described with reference to FIGS. 5 through 8.

At 1310, the UE may receive a signal indicating that CDM group hopping is enabled for the first TRP and the second TRP. The operations of 1310 may be performed according to the methods described herein. In some examples, aspects of the operations of 1310 may be performed by a CDM group hopping manager as described with reference to FIGS. 5 through 8.

At 1315, the UE may receive, during a first instance of the CDM group hopping, a first reference signal from the first TRP according to the first CDM group and a second reference signal from the second TRP according to the second CDM group. The operations of 1315 may be performed according to the methods described herein. In some examples, aspects of the operations of 1315 may be performed by a reference signal manager as described with reference to FIGS. 5 through 8.

At 1320, the UE may receive, during a second instance of the CDM group hopping, the first reference signal from the first TRP according to the second CDM group and the second reference signal from the second TRP according to the first CDM group. The operations of 1320 may be performed according to the methods described herein. In some examples, aspects of the operations of 1320 may be performed by a reference signal manager as described with reference to FIGS. 5 through 8.

Figure 14:
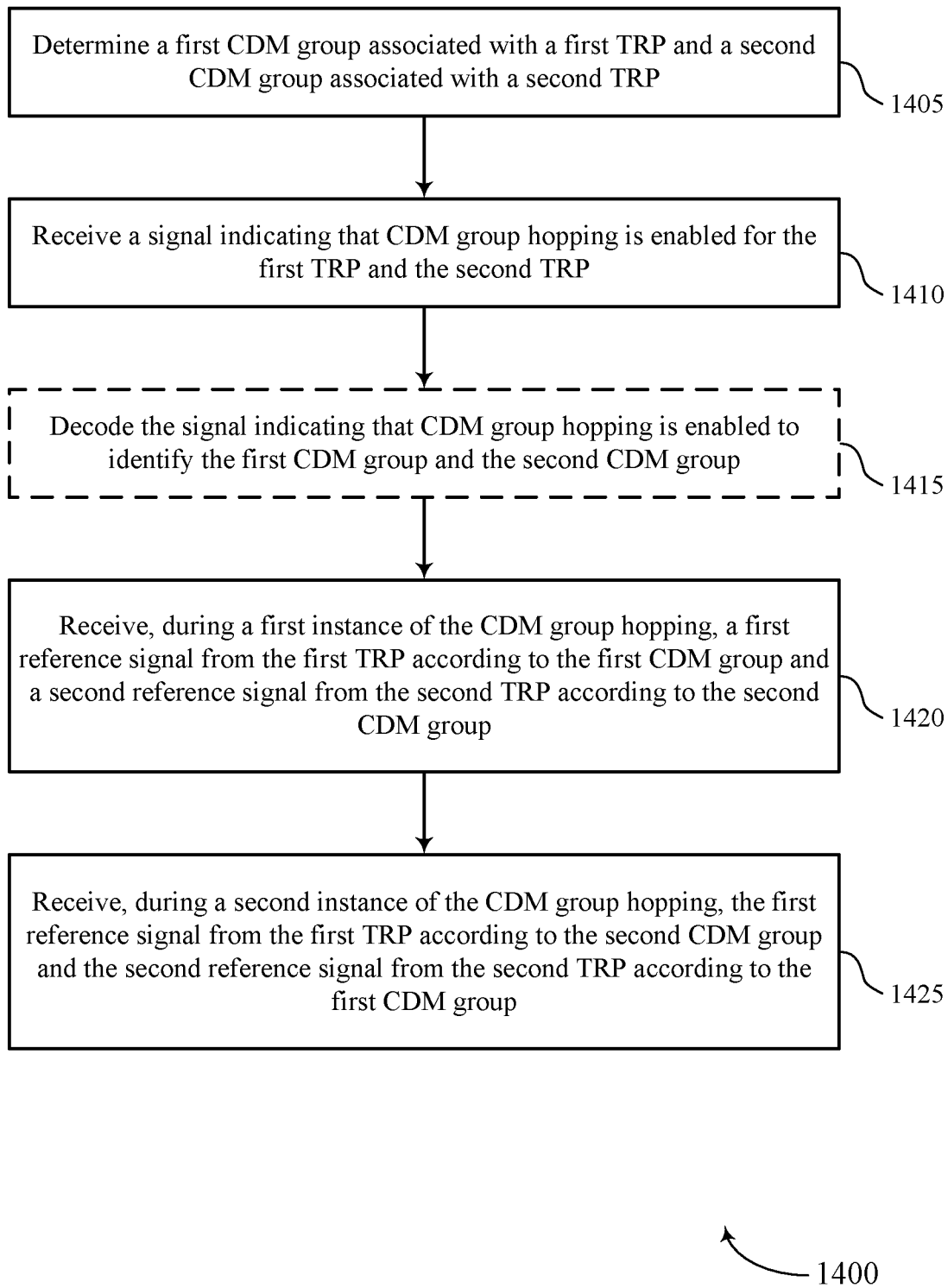

FIG. 14 shows a flowchart illustrating a method 1400 that supports CDM group hopping for multi-TRP, in accordance with one or more aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may determine a first CDM group associated with a first TRP and a second CDM group associated with a second TRP. The operations of 1405 may be performed according to the methods described herein. In some examples, aspects of the operations of 1405 may be performed by a CDM group manager as described with reference to FIGS. 5 through 8.

At 1410, the UE may receive a signal indicating that CDM group hopping is enabled for the first TRP and the second TRP. The operations of 1410 may be performed according to the methods described herein. In some examples, aspects of the operations of 1410 may be performed by a CDM group hopping manager as described with reference to FIGS. 5 through 8.

At 1415, the UE may decode the signal indicating that CDM group hopping is enabled to identify the first CDM group and the second CDM group. The operations of 1415 may be performed according to the methods described herein. In some examples, aspects of the operations of 1415 may be performed by a dynamic CDM group hopping indication manager as described with reference to FIGS. 5 through 8.

At 1420, the UE may receive, during a first instance of the CDM group hopping, a first reference signal from the first TRP according to the first CDM group and a second reference signal from the second TRP according to the second CDM group. The operations of 1420 may be performed according to the methods described herein. In some examples, aspects of the operations of 1420 may be performed by a reference signal manager as described with reference to FIGS. 5 through 8.

At 1425, the UE may receive, during a second instance of the CDM group hopping, the first reference signal from the first TRP according to the second CDM group and the second reference signal from the second TRP according to the first CDM group. The operations of 1425 may be performed according to the methods described herein. In some examples, aspects of the operations of 1425 may be performed by a reference signal manager as described with reference to FIGS. 5 through 8.

Figure 15:
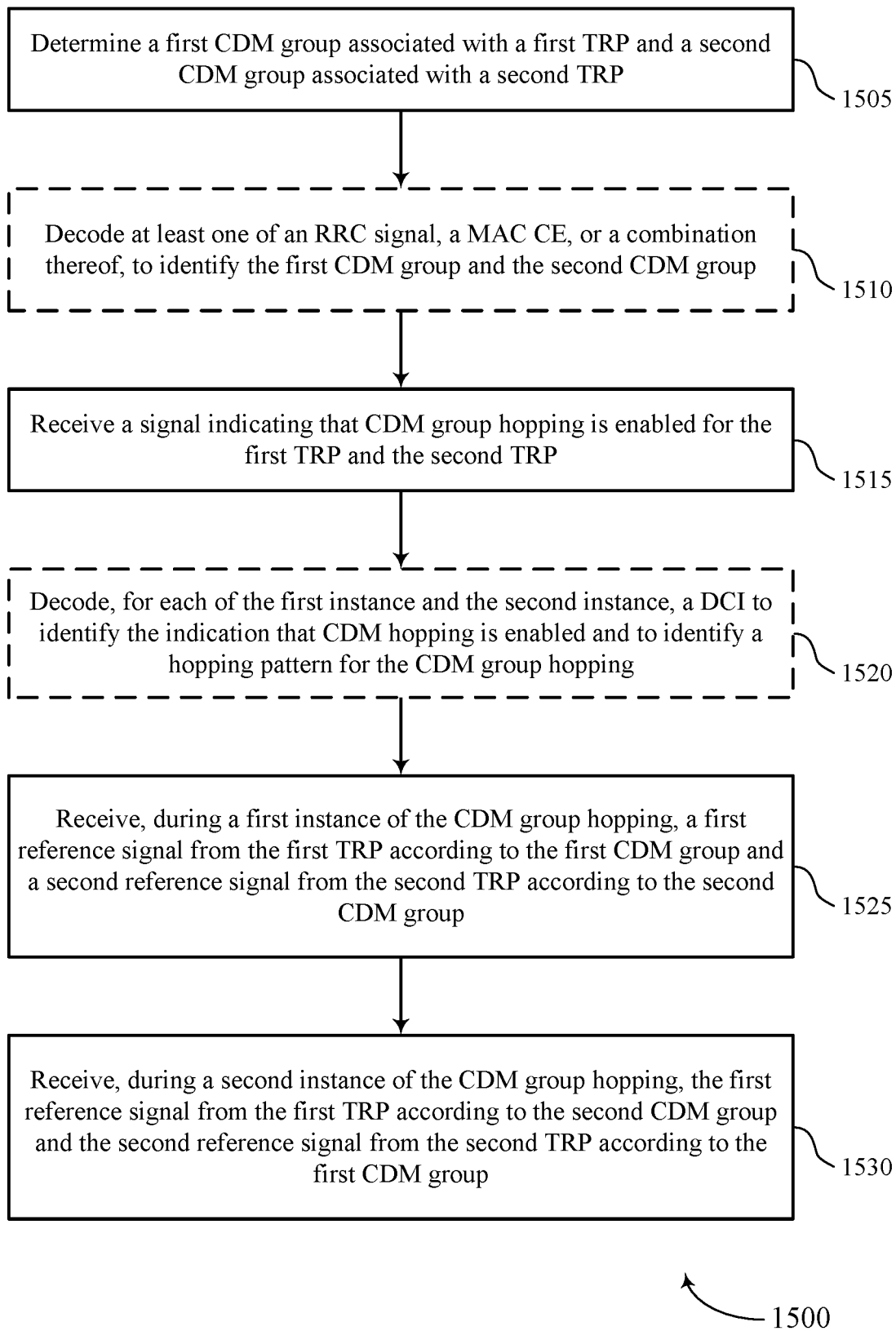

FIG. 15 shows a flowchart illustrating a method 1500 that supports CDM group hopping for multi-TRP, in accordance with one or more aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may determine a first CDM group associated with a first TRP and a second CDM group associated with a second TRP. The operations of 1505 may be performed according to the methods described herein. In some examples, aspects of the operations of 1505 may be performed by a CDM group manager as described with reference to FIGS. 5 through 8.

At 1510, the UE may decode at least one of an RRC signal, a MAC CE, or a combination thereof, to identify the first CDM group and the second CDM group. The operations of 1510 may be performed according to the methods described herein. In some examples, aspects of the operations of 1510 may be performed by a semi-static CDM group hopping indication manager as described with reference to FIGS. 5 through 8.

At 1515, the UE may receive a signal indicating that CDM group hopping is enabled for the first TRP and the second TRP. The operations of 1515 may be performed according to the methods described herein. In some examples, aspects of the operations of 1515 may be performed by a CDM group hopping manager as described with reference to FIGS. 5 through 8.

At 1520, the UE may decode, for each of the first instance and the second instance, a DCI to identify the indication that CDM hopping is enabled and to identify a hopping pattern for the CDM group hopping. The operations of 1520 may be performed according to the methods described herein. In some examples, aspects of the operations of 1520 may be performed by a semi-static CDM group hopping indication manager as described with reference to FIGS. 5 through 8.

At 1525, the UE may receive, during a first instance of the CDM group hopping, a first reference signal from the first TRP according to the first CDM group and a second reference signal from the second TRP according to the second CDM group. The operations of 1525 may be performed according to the methods described herein. In some examples, aspects of the operations of 1525 may be performed by a reference signal manager as described with reference to FIGS. 5 through 8.

At 1530, the UE may receive, during a second instance of the CDM group hopping, the first reference signal from the first TRP according to the second CDM group and the second reference signal from the second TRP according to the first CDM group. The operations of 1530 may be performed according to the methods described herein. In some examples, aspects of the operations of 1530 may be performed by a reference signal manager as described with reference to FIGS. 5 through 8.

Figure 16:
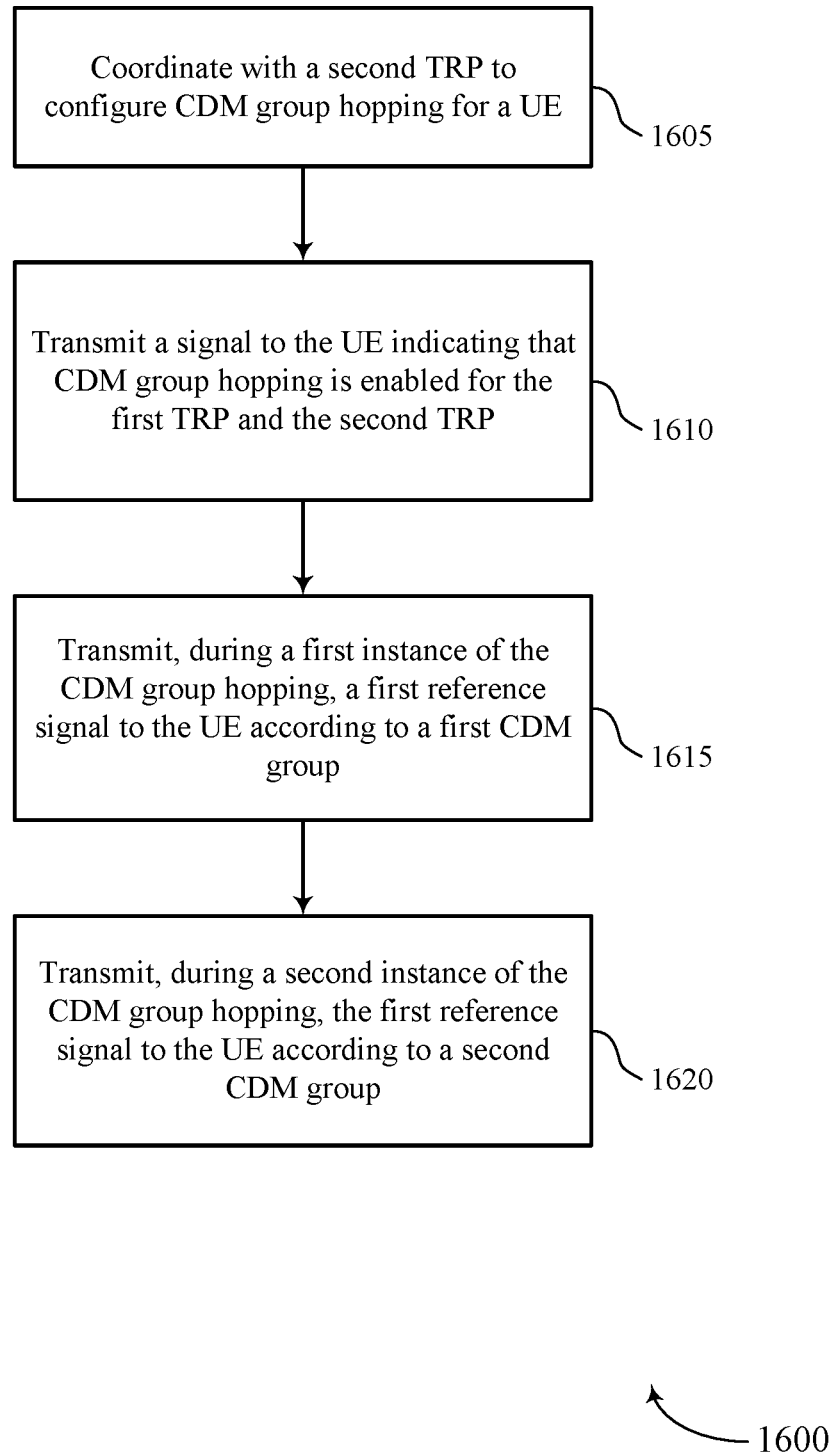

FIG. 16 shows a flowchart illustrating a method 1600 that supports CDM group hopping for multi-TRP, in accordance with one or more aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may coordinate with a second TRP to configure CDM group hopping for a UE. The operations of 1605 may be performed according to the methods described herein. In some examples, aspects of the operations of 1605 may be performed by a CDM group hopping coordination manager as described with reference to FIGS. 9 through 12.

At 1610, the base station may transmit a signal to the UE indicating that CDM group hopping is enabled for the first TRP and the second TRP. The operations of 1610 may be performed according to the methods described herein. In some examples, aspects of the operations of 1610 may be performed by a CDM group hopping manager as described with reference to FIGS. 9 through 12.

At 1615, the base station may transmit, during a first instance of the CDM group hopping, a first reference signal to the UE according to a first CDM group. The operations of 1615 may be performed according to the methods described herein. In some examples, aspects of the operations of 1615 may be performed by a reference signal manager as described with reference to FIGS. 9 through 12.

At 1620, the base station may transmit, during a second instance of the CDM group hopping, the first reference signal to the UE according to a second CDM group. The operations of 1620 may be performed according to the methods described herein. In some examples, aspects of the operations of 1620 may be performed by a reference signal manager as described with reference to FIGS. 9 through 12.

Figure 17:
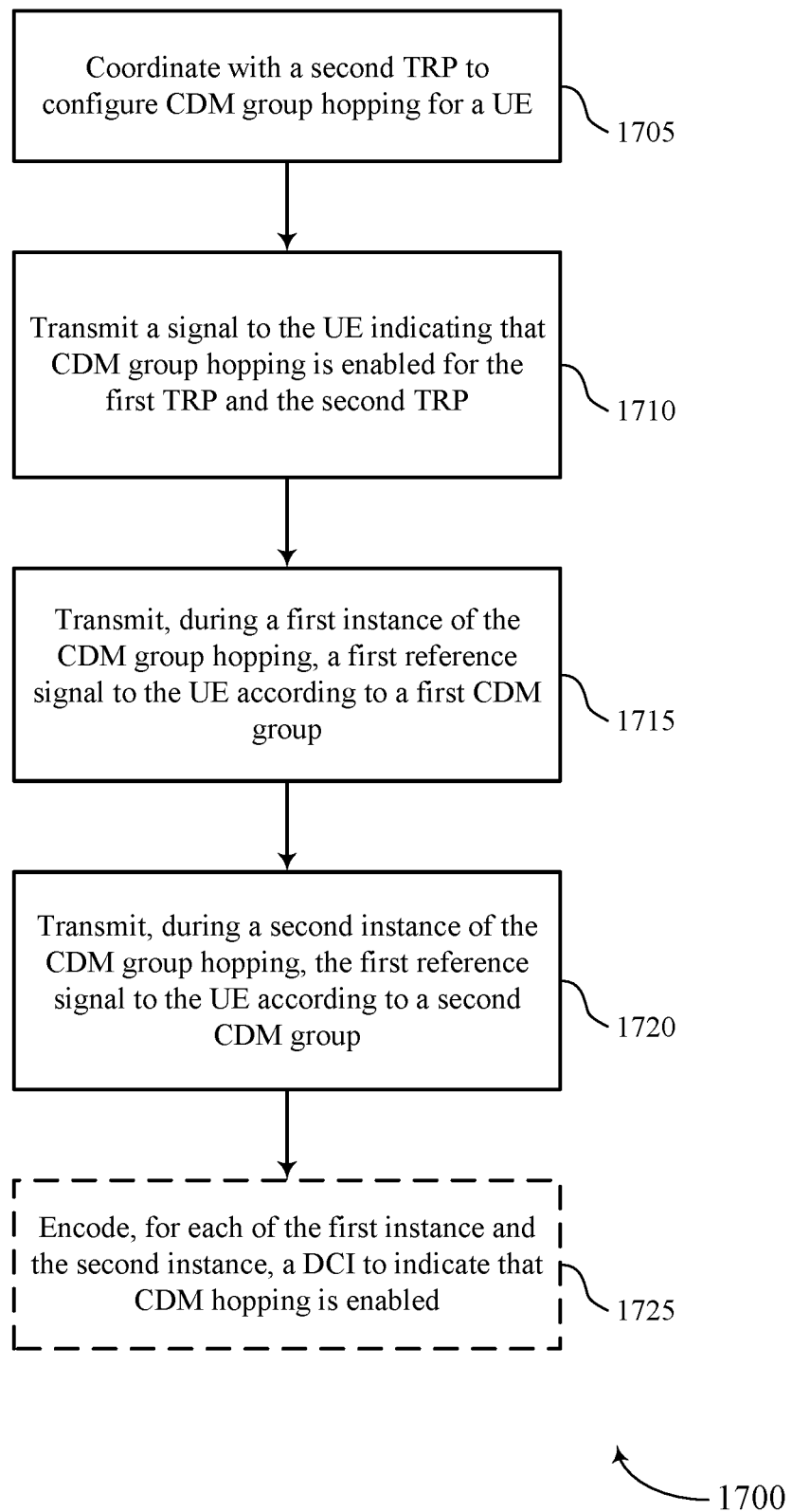

FIG. 17 shows a flowchart illustrating a method 1700 that supports CDM group hopping for multi-TRP, in accordance with one or more aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may coordinate with a second TRP to configure CDM group hopping for a UE. The operations of 1705 may be performed according to the methods described herein. In some examples, aspects of the operations of 1705 may be performed by a CDM group hopping coordination manager as described with reference to FIGS. 9 through 12.

At 1710, the base station may transmit a signal to the UE indicating that CDM group hopping is enabled for the first TRP and the second TRP. The operations of 1710 may be performed according to the methods described herein. In some examples, aspects of the operations of 1710 may be performed by a CDM group hopping manager as described with reference to FIGS. 9 through 12.

At 1715, the base station may transmit, during a first instance of the CDM group hopping, a first reference signal to the UE according to a first CDM group. The operations of 1715 may be performed according to the methods described herein. In some examples, aspects of the operations of 1715 may be performed by a reference signal manager as described with reference to FIGS. 9 through 12.

At 1720, the base station may transmit, during a second instance of the CDM group hopping, the first reference signal to the UE according to a second CDM group. The operations of 1720 may be performed according to the methods described herein. In some examples, aspects of the operations of 1720 may be performed by a reference signal manager as described with reference to FIGS. 9 through 12.

At 1725, the base station may encode, for each of the first instance and the second instance, a DCI to indicate that CDM hopping is enabled. The operations of 1725 may be performed according to the methods described herein. In some examples, aspects of the operations of 1725 may be performed by a DCI indication manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Example 1

A method for wireless communication at a UE, comprising: determining a first code division multiplexing group associated with a first transmission/reception point and a second code division multiplexing group associated with a second transmission/reception point; receiving a signal indicating that code division multiplexing group hopping is enabled for the first transmission/reception point and the second transmission/reception point; receiving, during a first instance of the code division multiplexing group hopping, a first reference signal from the first transmission/reception point according to the first code division multiplexing group and a second reference signal from the second transmission/reception point according to the second code division multiplexing group; and receiving, during a second instance of the code division multiplexing group hopping, the first reference signal from the first transmission/reception point according to the second code division multiplexing group and the second reference signal from the second transmission/reception point according to the first code division multiplexing group.

Example 2

The method of example 1, further comprising: decoding the signal indicating that code division multiplexing group hopping is enabled to identify the first code division multiplexing group and the second code division multiplexing group.

Example 3

The method of example 2, wherein the signal comprises at least one of a radio resource control signal, a medium access control control element, or a combination thereof.

Example 4

The method of example 3, wherein the signal indicates a hopping pattern for the code division multiplexing group hopping, and the first instance and the second instance are based at least in part on the hopping pattern.

Example 5

The method of examples 1 to 4, further comprising: decoding at least one of a radio resource control signal, a medium access control control element, or a combination thereof, to identify the first code division multiplexing group and the second code division multiplexing group; and decoding, for each of the first instance and the second instance, a downlink control information to identify the indication that code division multiplexing hopping is enabled and to identify a hopping pattern for the code division multiplexing group hopping.

Example 6

The method of example 5, further comprising: decoding, for each of the first instance and the second instance, a demodulation reference signal port toggling flag of the downlink control information to identify the indication that code division multiplexing group hopping is enabled.

Example 7

The method of examples 1 to 6, further comprising: decoding, for each of the first instance and the second instance, a downlink control information to identify the indication that code division multiplexing hopping is enabled.

Example 8

The method of example 7, further comprising: recovering, for each of the first instance and the second instance, an antenna port parameter value from the downlink control information; and accessing, using the antenna port parameter value, an antenna port mapping table to identify the first code division multiplexing group associated with the first transmission/reception point and the second code division multiplexing group associated with the second transmission/reception point.

Example 9

The method of examples 1 to 8, further comprising: identifying a third code division multiplexing group associated with a third transmission/reception point; and receiving, during a third instance of the code division multiplexing group hopping, a third reference signal from the third transmission/reception point according to the third code division multiplexing group.

Example 10

A method for wireless communication at a first transmission/reception point, comprising: coordinating with a second transmission/reception point to configure code division multiplexing group hopping for a user equipment (UE); transmitting a signal to the UE indicating that code division multiplexing group hopping is enabled for the first transmission/reception point and the second transmission/reception point; transmitting, during a first instance of the code division multiplexing group hopping, a first reference signal to the UE according to a first code division multiplexing group; and transmitting, during a second instance of the code division multiplexing group hopping, the first reference signal to the UE according to a second code division multiplexing group.

Example 11

The method of example 10, further comprising: encoding the signal indicating that code division multiplexing group hopping is enabled to identify the first code division multiplexing group and the second code division multiplexing group.

Example 12

The method of example 11, wherein the signal comprises at least one of a radio resource control signal, a medium access control control element, or a combination thereof.

Example 13

The method of example 12, wherein the signal indicates a hopping pattern for the code division multiplexing group hopping, and the first instance and the second instance are based at least in part on the hopping pattern.

Example 14

The method of examples 10 to 13, further comprising: encoding at least one of a radio resource control signal, a medium access control control element, or a combination thereof, to indicate the first code division multiplexing group and the second code division multiplexing group; and encoding, for each of the first instance and the second instance, a downlink control information to indicate that code division multiplexing hopping is enabled and to indicate a hopping pattern for the code division multiplexing group hopping.

Example 15

The method of example 14, further comprising: encoding, for each of the first instance and the second instance, a demodulation reference signal port toggling flag of the downlink control information to indicate that code division multiplexing group hopping is enabled.

Example 16

The method of examples 10 to 14, further comprising: encoding, for each of the first instance and the second instance, a downlink control information to indicate that code division multiplexing hopping is enabled.

Example 17

The method of example 16, further comprising: encoding, for each of the first instance and the second instance, an antenna port parameter value of the downlink control information to indicate the first code division multiplexing group associated and the second code division multiplexing group.

Example 18

The method of claim examples 10 to 17, further comprising: coordinating with a third transmission/reception point to configure the code division multiplexing group hopping for the UE; and transmitting, during a third instance of the code division multiplexing group hopping, the first reference signal to the UE according to a third code division multiplexing group.

Example 19

An apparatus for wireless communication at a user equipment (UE), comprising: a processor; and memory coupled to the processor, the processor and memory configured to: determine a first code division multiplexing group associated with a first transmission/reception point and a second code division multiplexing group associated with a second transmission/reception point; receive a signal indicating that code division multiplexing group hopping is enabled for the first transmission/reception point and the second transmission/reception point; receive, during a first instance of the code division multiplexing group hopping, a first reference signal from the first transmission/reception point according to the first code division multiplexing group and a second reference signal from the second transmission/reception point according to the second code division multiplexing group; and receive, during a second instance of the code division multiplexing group hopping, the first reference signal from the first transmission/reception point according to the second code division multiplexing group and the second reference signal from the second transmission/reception point according to the first code division multiplexing group.

Example 20

The apparatus of example 19, the memory and processor further configured to: decode the signal indicating that code division multiplexing group hopping is enabled to identify the first code division multiplexing group and the second code division multiplexing group.

Example 21

The apparatus of example 20, wherein the signal comprises at least one of a radio resource control signal, a medium access control control element, or a combination thereof.

Example 22

The apparatus of example 21, wherein the signal indicates a hopping pattern for the code division multiplexing group hopping, and the first instance and the second instance are based at least in part on the hopping pattern.

Example 23

The apparatus of examples 19 to 22, the memory and processor further configured to: decode at least one of a radio resource control signal, a medium access control control element, or a combination thereof, to identify the first code division multiplexing group and the second code division multiplexing group; and decode, for each of the first instance and the second instance, a downlink control information to identify the indication that code division multiplexing hopping is enabled and to identify a hopping pattern for the code division multiplexing group hopping.

Example 24

The apparatus of examples 19 to 23, the memory and processor further configured to: decode, for each of the first instance and the second instance, a downlink control information to identify the indication that code division multiplexing hopping is enabled.

Example 25

The apparatus of examples 19 to 24, the memory and processor further configured to: identify a third code division multiplexing group associated with a third transmission/reception point; and receive, during a third instance of the code division multiplexing group hopping, a third reference signal from the third transmission/reception point according to the third code division multiplexing group.

Example 26

An apparatus for wireless communication at a first transmission reception point, comprising: a processor; and memory coupled with the processor, the processor and memory configured to: coordinate with a second transmission/reception point to configure code division multiplexing group hopping for a UE; transmit a signal to the UE indicating that code division multiplexing group hopping is enabled for the first transmission/reception point and the second transmission/reception point; transmit, during a first instance of the code division multiplexing group hopping, a first reference signal to the UE according to a first code division multiplexing group; and transmit, during a second instance of the code division multiplexing group hopping, the first reference signal to the UE according to a second code division multiplexing group.

Example 27

The apparatus of example 26, the memory and processor further configured to: encode the signal indicating that code division multiplexing group hopping is enabled to identify the first code division multiplexing group and the second code division multiplexing group.

Example 28

The apparatus of example 26 or 27, the memory and processor further configured to: encode at least one of a radio resource control signal, a medium access control control element, or a combination thereof, to indicate the first code division multiplexing group and the second code division multiplexing group; and encode, for each of the first instance and the second instance, a downlink control information to indicate that code division multiplexing hopping is enabled and to indicate a hopping pattern for the code division multiplexing group hopping.

Example 29

The apparatus of examples 26 to 28, the memory and processor further configured to: encode, for each of the first instance and the second instance, a downlink control information to indicate that code division multiplexing hopping is enabled.

Example 30

The apparatus of examples 26 to 29, the memory and processor further configured to: coordinate with a third transmission/reception point to configure the code division multiplexing group hopping for the UE; and transmit, during a third instance of the code division multiplexing group hopping, the first reference signal to the UE according to a third code division multiplexing group.

Example 31

An apparatus comprising at least one means for performing a method of any of examples 1 to 9.

Example 32

An apparatus comprising at least one means for performing a method of any of examples 10 to 18.

Example 33

A non-transitory computer-readable medium storing code for wireless communications, the code comprising instructions executable by a processor to perform a method of any of examples 1 to 9.

Example 34

A non-transitory computer-readable medium storing code for wireless communications, the code comprising instructions executable by a processor to perform a method of any of examples 10 to 18.

Techniques described herein may be used for various wireless communication systems such as CDMA, TDMA, FDMA, OFDMA, single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining a first code division multiplexing group associated with a first transmission/reception point and a second code division multiplexing group associated with a second transmission/reception point;
   receiving a signal indicating that code division multiplexing group hopping is enabled for the first transmission/reception point and the second transmission/reception point;
   decoding, for each of a first instance of the code division multiplexing group hopping and a second instance of the code division multiplexing group hopping, a demodulation reference signal port toggling flag of a downlink control information to identify the indication that code division multiplexing group hopping is enabled;
   receiving, during the first instance, a first reference signal from the first transmission/reception point according to the first code division multiplexing group and a second reference signal from the second transmission/reception point according to the second code division multiplexing group; and
   receiving, the second instance, the first reference signal from the first transmission/reception point according to the second code division multiplexing group and the second reference signal from the second transmission/reception point according to the first code division multiplexing group.

2. The method of claim 1, further comprising:
   decoding the signal indicating that code division multiplexing group hopping is enabled to identify the first code division multiplexing group and the second code division multiplexing group.

3. The method of claim 2, wherein the signal comprises at least one of a radio resource control signal, a medium access control-control element (MAC-CE), or a combination thereof.

4. The method of claim 3, wherein the signal indicates a hopping pattern for the code division multiplexing group hopping, and the first instance and the second instance are based at least in part on the hopping pattern.

5. The method of claim 1, further comprising:
   decoding at least one of a radio resource control signal, a medium access control-control element (MAC-CE), or a combination thereof, to identify the first code division multiplexing group and the second code division multiplexing group; and
   decoding, for each of the first instance and the second instance, the downlink control information to identify the indication that code division multiplexing hopping is enabled and to identify a hopping pattern for the code division multiplexing group hopping.

6. The method of claim 1, further comprising:
   decoding, for each of the first instance and the second instance, the downlink control information to identify the indication that code division multiplexing hopping is enabled.

7. The method of claim 6, further comprising:
   recovering, for each of the first instance and the second instance, an antenna port parameter value from the downlink control information; and
   accessing, using the antenna port parameter value, an antenna port mapping table to identify the first code division multiplexing group associated with the first transmission/reception point and the second code division multiplexing group associated with the second transmission/reception point.

8. The method of claim 1, further comprising:
   identifying a third code division multiplexing group associated with a third transmission/reception point; and
   receiving, during a third instance of the code division multiplexing group hopping, a third reference signal from the third transmission/reception point according to the third code division multiplexing group.

9. A method for wireless communication at a first transmission/reception point, comprising:
   coordinating with a second transmission/reception point to configure code division multiplexing group hopping for a user equipment (UE);
   encoding, for each of a first instance of the code division multiplexing group hopping and a second instance of the code division multiplexing group hopping, a demodulation reference signal port toggling flag of a downlink control information to indicate that code division multiplexing group hopping is enabled;

transmitting a signal to the UE indicating that code division multiplexing group hopping is enabled for the first transmission/reception point and the second transmission/reception point;

transmitting, during the first instance, a first reference signal to the UE according to a first code division multiplexing group; and transmitting, during the second instance, the first reference signal to the UE according to a second code division multiplexing group.

10. The method of claim 9, further comprising:
encoding the signal indicating that code division multiplexing group hopping is enabled to identify the first code division multiplexing group and the second code division multiplexing group.

11. The method of claim 10, wherein the signal comprises at least one of a radio resource control signal, a medium access control-control element (MAC-CE), or a combination thereof.

12. The method of claim 11, wherein the signal indicates a hopping pattern for the code division multiplexing group hopping, and the first instance and the second instance are based at least in part on the hopping pattern.

13. The method of claim 9, further comprising:
encoding at least one of a radio resource control signal, a medium access control-control element (MAC-CE), or a combination thereof, to indicate the first code division multiplexing group and the second code division multiplexing group; and encoding, for each of the first instance and the second instance, the downlink control information to indicate that code division multiplexing hopping is enabled and to indicate a hopping pattern for the code division multiplexing group hopping.

14. The method of claim 9, further comprising:
encoding, for each of the first instance and the second instance, the downlink control information to indicate that code division multiplexing hopping is enabled.

15. The method of claim 14, further comprising:
encoding, for each of the first instance and the second instance, an antenna port parameter value of the downlink control information to indicate the first code division multiplexing group associated and the second code division multiplexing group.

16. The method of claim 9, further comprising:
coordinating with a third transmission/reception point to configure the code division multiplexing group hopping for the UE; and transmitting, during a third instance of the code division multiplexing group hopping, the first reference signal to the UE according to a third code division multiplexing group.

17. An apparatus for wireless communication at a user equipment (UE), comprising: a processor; and memory coupled to the processor, the processor and memory configured to:
determine a first code division multiplexing group associated with a first transmission/reception point and a second code division multiplexing group associated with a second transmission/reception point;

receive a signal indicating that code division multiplexing group hopping is enabled for the first transmission/reception point and the second transmission/reception point;

decode, for each of a first instance of the code division multiplexing group hopping and a second instance of the code division multiplexing group hopping, a demodulation reference signal port toggling flag of a downlink control information to identify the indication that code division multiplexing group hopping is enabled;

receive, during the first instance, a first reference signal from the first transmission/reception point according to the first code division multiplexing group and a second reference signal from the second transmission/reception point according to the second code division multiplexing group; and receive, during the second instance, the first reference signal from the first transmission/reception point according to the second code division multiplexing group and the second reference signal from the second transmission/reception point according to the first code division multiplexing group.

18. The apparatus of claim 17, the memory and processor further configured to:
decode the signal indicating that code division multiplexing group hopping is enabled to identify the first code division multiplexing group and the second code division multiplexing group.

19. The apparatus of claim 18, wherein the signal comprises at least one of a radio resource control signal, a medium access control-control element (MAC-CE), or a combination thereof.

20. The apparatus of claim 19, wherein the signal indicates a hopping pattern for the code division multiplexing group hopping, and the first instance and the second instance are based at least in part on the hopping pattern.

21. The apparatus of claim 17, the memory and processor further configured to:
decode at least one of a radio resource control signal, a medium access control-control element (MAC-CE), or a combination thereof, to identify the first code division multiplexing group and the second code division multiplexing group; and decode, for each of the first instance and the second instance, the downlink control information to identify the indication that code division multiplexing hopping is enabled and to identify a hopping pattern for the code division multiplexing group hopping.

22. The apparatus of claim 17, the memory and processor further configured to:
decode, for each of the first instance and the second instance, the downlink control information to identify the indication that code division multiplexing hopping is enabled.

23. The apparatus of claim 17, the memory and processor further configured to:
identify a third code division multiplexing group associated with a third transmission/reception point; and receive, during a third instance of the code division multiplexing group hopping, a third reference signal from the third transmission/reception point according to the third code division multiplexing group.

24. An apparatus for wireless communication at a first transmission/reception point, comprising: a processor; and memory coupled with the processor, the processor and memory configured to:
coordinate with a second transmission/reception point to configure code division multiplexing group hopping for a user equipment (UE);

encoding, for each of a first instance of the code division multiplexing group hopping and a second instance of the code division multiplexing group hopping, a demodulation reference signal port toggling flag of a downlink control information to indicate that code division multiplexing group hopping is enabled;

transmit a signal to the UE indicating that code division multiplexing group hopping is enabled for the first transmission/reception point and the second transmission/reception point;

transmit, during the first instance, a first reference signal to the UE according to a first code division multiplexing group; and transmit, during the second instance, the first reference signal to the UE according to a second code division multiplexing group.

25. The apparatus of claim 24, the memory and processor further configured to:

encode the signal indicating that code division multiplexing group hopping is enabled to identify the first code division multiplexing group and the second code division multiplexing group.

26. The apparatus of claim 24, the memory and processor further configured to:

encode at least one of a radio resource control signal, a medium access control-control element (MAC-CE), or a combination thereof, to indicate the first code division multiplexing group and the second code division multiplexing group; and encode, for each of the first instance and the second instance, the downlink control information to indicate that code division multiplexing hopping is enabled and to indicate a hopping pattern for the code division multiplexing group hopping.

27. The apparatus of claim 24, the memory and processor further configured to:

encode, for each of the first instance and the second instance, the downlink control information to indicate that code division multiplexing hopping is enabled.

28. The apparatus of claim 24, the memory and processor further configured to:

coordinate with a third transmission/reception point to configure the code division multiplexing group hopping for the UE; and transmit, during a third instance of the code division multiplexing group hopping, the first reference signal to the UE according to a third code division multiplexing group.

29. A non-transitory computer-readable medium storing code for wireless communications at a user equipment (UE), the code comprising instructions executable to:

determine a first code division multiplexing group associated with a first transmission/reception point and a second code division multiplexing group associated with a second transmission/reception point;

receive a signal indicating that code division multiplexing group hopping is enabled for the first transmission/reception point and the second transmission/reception point;

decode, for each of a first instance of the code division multiplexing group hopping and a second instance of the code division multiplexing group hopping, a demodulation reference signal port toggling flag of a downlink control information to identify the indication that code division multiplexing group hopping is enabled;

receive, during the first instance, a first reference signal from the first transmission/reception point according to the first code division multiplexing group and a second reference signal from the second transmission/reception point according to the second code division multiplexing group; and receive, during the second instance, the first reference signal from the first transmission/reception point according to the second code division multiplexing group and the second reference signal from the second transmission/reception point according to the first code division multiplexing group.

30. A non-transitory computer-readable medium storing code for wireless communications at a first transmission/reception point, the code comprising instructions executable to:

coordinate with a second transmission/reception point to configure code division multiplexing group hopping for a user equipment (UE);

encode, for each of a first instance of the code division multiplexing group hopping and a second instance of the code division multiplexing group hopping, a demodulation reference signal port toggling flag of a downlink control information to indicate that code division multiplexing group hopping is enabled;

transmit a signal to the UE indicating that code division multiplexing group hopping is enabled for the first transmission/reception point and the second transmission/reception point;

transmit, during the first instance, a first reference signal to the UE according to a first code division multiplexing group; and transmit, during the second instance, the first reference signal to the UE according to a second code division multiplexing group.

31. An apparatus for wireless communications at a user equipment (UE), comprising:

means for receiving a signal indicating that code division multiplexing group hopping is enabled for a first transmission/reception point and a second transmission/reception point, wherein a first code division multiplexing group is associated with the first transmission/reception point and a second code division multiplexing group is associated with the second transmission/reception point;

means for receiving, during a first instance of the code division multiplexing group hopping, a first reference signal from the first transmission/reception point according to the first code division multiplexing group and a second reference signal from the second transmission/reception point according to the second code division multiplexing group based at least in part on decoding, for the first instance, a first demodulation reference signal port toggling flag of a downlink control information to identify the indication that code division multiplexing group hopping is enabled; and means for receiving, during a second instance of the code division multiplexing group hopping, the first reference signal from the first transmission/reception point according to the second code division multiplexing group and the second reference signal from the second transmission/reception point according to the first code division multiplexing group based at least in part on decoding, for the second instance, a second demodulation reference signal port toggling flag of the downlink control information to identify the indication that code division multiplexing group hopping is enabled.

32. An apparatus for wireless communications at a first transmission/reception point, comprising:

means for transmitting a signal to a user equipment (UE) indicating that code division multiplexing group hopping is enabled for the first transmission/reception point and a second transmission/reception point based at least in part on coordinating with the second transmission/reception point to configure code division multiplexing group hopping for the UE;

means for transmitting, during a first instance of the code division multiplexing group hopping, a first reference signal to the UE according to a first code division multiplexing group based at least in part on encoding, for the first instance, a first demodulation reference signal port toggling flag of a downlink control information to identify the indication that code division multiplexing group hopping is enabled; and means for transmitting, during a second instance of the code division multiplexing group hopping, the first reference signal to the UE according to a second code division multiplexing group based at least in part on encoding, for the second instance, a second demodulation reference signal port toggling flag of the downlink control information to identify the indication that code division multiplexing group hopping is enabled.

\* \* \* \* \*